United States Patent
Fukui et al.

(10) Patent No.: US 12,207,251 B2
(45) Date of Patent: Jan. 21, 2025

(54) TERMINAL APPARATUS AND BASE STATION APPARATUS

(71) Applicant: SHARP KABUSHIKI KAISHA, Sakai (JP)

(72) Inventors: Takahisa Fukui, Sakai (JP); Shoichi Suzuki, Sakai (JP); Toshizo Nogami, Sakai (JP); Daiichiro Nakashima, Sakai (JP); Wataru Ouchi, Sakai (JP); Tomoki Yoshimura, Sakai (JP); Huifa Lin, Sakai (JP); Ryota Morimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 351 days.

(21) Appl. No.: 17/691,890

(22) Filed: Mar. 10, 2022

(65) Prior Publication Data
US 2023/0247622 A1    Aug. 3, 2023

(30) Foreign Application Priority Data
Feb. 1, 2022   (JP) .................................. 2022-014348

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
None
See application file for complete search history.

(56) References Cited

U.S. PATENT DOCUMENTS

| | | |
|---|---|---|
| 11,108,505 B2 | 8/2021 | Babaei |
| 2021/0007088 A1* | 1/2021 | Zhou .................. H04W 72/044 |
| 2021/0185718 A1 | 6/2021 | Ying et al. |
| 2022/0007399 A1* | 1/2022 | Rastegardoost ...... H04L 5/0055 |
| 2022/0361153 A1* | 11/2022 | Liu .................. H04W 72/23 |
| 2022/0394734 A1* | 12/2022 | MolavianJazi ....... H04W 72/23 |
| 2023/0027895 A1* | 1/2023 | Lin ........................ H04W 72/20 |
| 2023/0083549 A1* | 3/2023 | Li .......................... H04L 5/0098 370/329 |

FOREIGN PATENT DOCUMENTS

WO    2021/101352 A1    5/2021

OTHER PUBLICATIONS

Author Unknown, Feature lead summary#1 on PDCCH enhancements, pp. 1-12, Feb. 5 (Year: 2021).*

* cited by examiner

*Primary Examiner* — Christopher M Crutchfield
(74) *Attorney, Agent, or Firm* — ScienBiziP, P.C.

(57) ABSTRACT

A terminal apparatus includes a receiver configured to receive a DCI format, a first higher layer parameter determines at least a periodicity of a first SPS PDSCH, a second higher layer parameter determines at least a periodicity of a second SPS PDSCH, the first SPS PDSCH is deactivated by the DCI format, the second SPS PDSCH is activated by the DCI format, the periodicity of the first SPS PDSCH is different from the periodicity of the second SPS PDSCH, and the receiver receives the second SPS PDSCH based on the second higher layer parameter.

4 Claims, 11 Drawing Sheets

Figure 2A: Number of OFDM symbols per slot, slots per frame, and slots per subframe for normal cyclic prefix

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 2B: Number of OFDM symbols per slot, slots per frame, and slots per subframe for extended cyclic prefix

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

The terminal device 1 shall:

> 906a> instruct the physical layer to receive, in the PDSCH duration of the configured downlink assignment, the transport block on the DL-SCH according to the configured downlink assignment and to deliver the transport block to the HARQ entity;
>
> 906b> set the HARQ Process ID to the HARQ Process ID associated with this PDSCH duration;
>
> 906c> consider the NDI bit to have been toggled; and
>
> 906d> indicate the presence of a configured downlink assignment and deliver the stored HARQ information to the HARQ entity.

The terminal device 1 (HARQ entity) shall:

> 906e> allocate the TB(s) received from the physical layer and the associated HARQ information to the HARQ process indicated by the associated HARQ information.

The terminal device 1 (HARQ process) shall:

> 906f> attempt to decode the received TB(s); and
>
> 906g> instruct the physical layer to generate acknowledgement(s) of the data in this TB.

FIG. 10

TERMINAL APPARATUS AND BASE STATION APPARATUS

TECHNICAL FIELD

The present invention relates to a terminal apparatus and a base station apparatus.

BACKGROUND ART

In $3^{rd}$ Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as User Equipment (UE). LTE is a cellular communication system in which multiple areas covered by a base station apparatus are distributed in a cell structure. A single base station apparatus may manage multiple serving cells.

3GPP has been studying a next generation standard (New Radio or NR) (NPL 1) to make a proposal for International Mobile Telecommunication (IMT)-2020, a standard for a next generation mobile communication system developed by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

3GPP has been studying expansion of services supported by NR (NPL 2).

CITATION LIST

Non Patent Literature

NPL 1: "New SID proposal: Study on New Radio Access Technology", RP-160671, NTT docomo, 3GPP TSG RAN Meeting #71, Goteborg, Sweden, 7-10 Mar. 2016.

NPL 2: "Release 17 package for RAN", RP-193216, RAN chairman, RAN1 chairman, RAN2 chairman, RAN3 chairman, 3GPP TSG RAN Meeting #86, Sitges, Spain, 9-12 Dec. 2019

NPL 3: "Release 18 package summary", RP-213469, RAN chairman, RAN1 chairman, RAN2 chairman, RAN3 chairman, 3GPP TSG RAN Meeting #94-e, 6-17 Dec. 2021

SUMMARY OF INVENTION

Technical Problem

The present invention provides a terminal apparatus that efficiently performs communication, a communication method used for the terminal apparatus, a base station apparatus that efficiently performs communication, and a communication method used for the base station apparatus.

Solution to Problem (1) A first aspect of the present invention provides a terminal apparatus including a receiver configured to receive a DCI format, wherein a first higher layer parameter determines at least a periodicity of a first SPS PDSCH, a second higher layer parameter determines at least a periodicity of a second SPS PDSCH, the first SPS PDSCH is deactivated by the DCI format, the second SPS PDSCH is activated by the DCI format, the periodicity of the first SPS PDSCH is different from the periodicity of the second SPS PDSCH, and the receiver receives the second SPS PDSCH based on the second higher layer parameter.

(2) A second aspect of the present invention provides a base station apparatus including a transmitter configured to transmit a DCI format, wherein a first higher layer parameter determines at least a periodicity of a first SPS PDSCH, a second higher layer parameter determines at least a periodicity of a second SPS PDSCH, the first SPS PDSCH is deactivated by the DCI format, the second SPS PDSCH is activated by the DCI format, the periodicity of the first SPS PDSCH is different from the periodicity of the second SPS PDSCH, and the transmitter transmits the second SPS PDSCH based on the second higher layer parameter.

(3) A third aspect of the present invention provides a communication method used for a terminal apparatus, the communication method including the step of receiving a DCI format, wherein a first higher layer parameter determines at least a periodicity of a first SPS PDSCH, a second higher layer parameter determines at least a periodicity of a second SPS PDSCH, the first SPS PDSCH is deactivated by the DCI format, the second SPS PDSCH is activated by the DCI format, the periodicity of the first SPS PDSCH is different from the periodicity of the second SPS PDSCH, and the second SPS PDSCH is received based on the second higher layer parameter.

(4) A fourth aspect of the present invention provides a communication method used for a base station apparatus, the communication method including the step of transmitting a DCI format, wherein a first higher layer parameter determines at least a periodicity of a first SPS PDSCH, a second higher layer parameter determines at least a periodicity of a second SPS PDSCH, the first SPS PDSCH is deactivated by the DCI format, the second SPS PDSCH is activated by the DCI format, the periodicity of the first SPS PDSCH is different from the periodicity of the second SPS PDSCH, and the second SPS PDSCH is transmitted based on the second higher layer parameter.

Advantageous Effects of Invention

According to the present invention, the terminal apparatus can efficiently perform communication. The base station apparatus can efficiently perform communication.

BRIEF DESCRIPTION OF DRAWINGS

FIG. 2 is an example illustrating a relationship between a subcarrier spacing configuration μ, the number $N^{slot}_{symb}$ of OFDM symbols per slot, and a cyclic Prefix (CP) configuration according to an aspect of the present embodiment.

FIG. 10 is a diagram illustrating a detailed example of 906 in the present embodiment according to an aspect of the present embodiment.

DESCRIPTION OF EMBODIMENTS

An embodiment of the present invention will be described below.

floor(C) may be a floor function for a real number C. For example, floor(C) may be a function that outputs a maximum integer in a range of not exceeding the real number C. ceil(D) may be a roof function for a real number D. For example, ceil(D) may be a function that outputs a minimum integer in a range of not falling below the real number D. mod(E, F) may be a function that outputs a remainder obtained by dividing E by F. mod(E, F) may be a function that outputs a value corresponding to the remainder obtained by dividing E by F. E modulo F may refer to output of a remainder obtained by dividing E by F. exp(G)=e^G. Here, e is a Napier's constant. H^I represents H to the power of I. max (J, K) is a function that outputs the largest value of J and K. Here, max (J, K) is a function that outputs J or K in a case that J and K are equal. min (L, M) is a function that outputs the smallest value of L and M. Here, min (L, M) is a function that outputs L or M in a case that L and M are equal. round (N) is a function that outputs an integer value closest to N. "·" represents multiplication.

In the radio communication system according to an aspect of the present embodiment, Orthogonal Frequency Division Multiplex (OFDM) is at least used. An OFDM symbol is a unit of OFDM in the time domain. The OFDM symbol at least includes one or multiple subcarriers. The OFDM symbol is converted into a time-continuous signal in baseband signal generation. In the downlink, Cyclic Prefix-Orthogonal Frequency Division Multiplex (CP-OFDM) is at least used. In the uplink, either of CP-OFDM or Discrete Fourier Transform-spread-Orthogonal Frequency Division Multiplex (DFT-s-OFDM) is used. With Transform precoding being applied to CP-OFDM, DFT-s-OFDM may be given.

The OFDM symbol may be a term including a CP added to the OFDM symbol. In other words, a certain OFDM symbol may include the certain OFDM symbol, and a CP added to the certain OFDM symbol.

Figure 1:
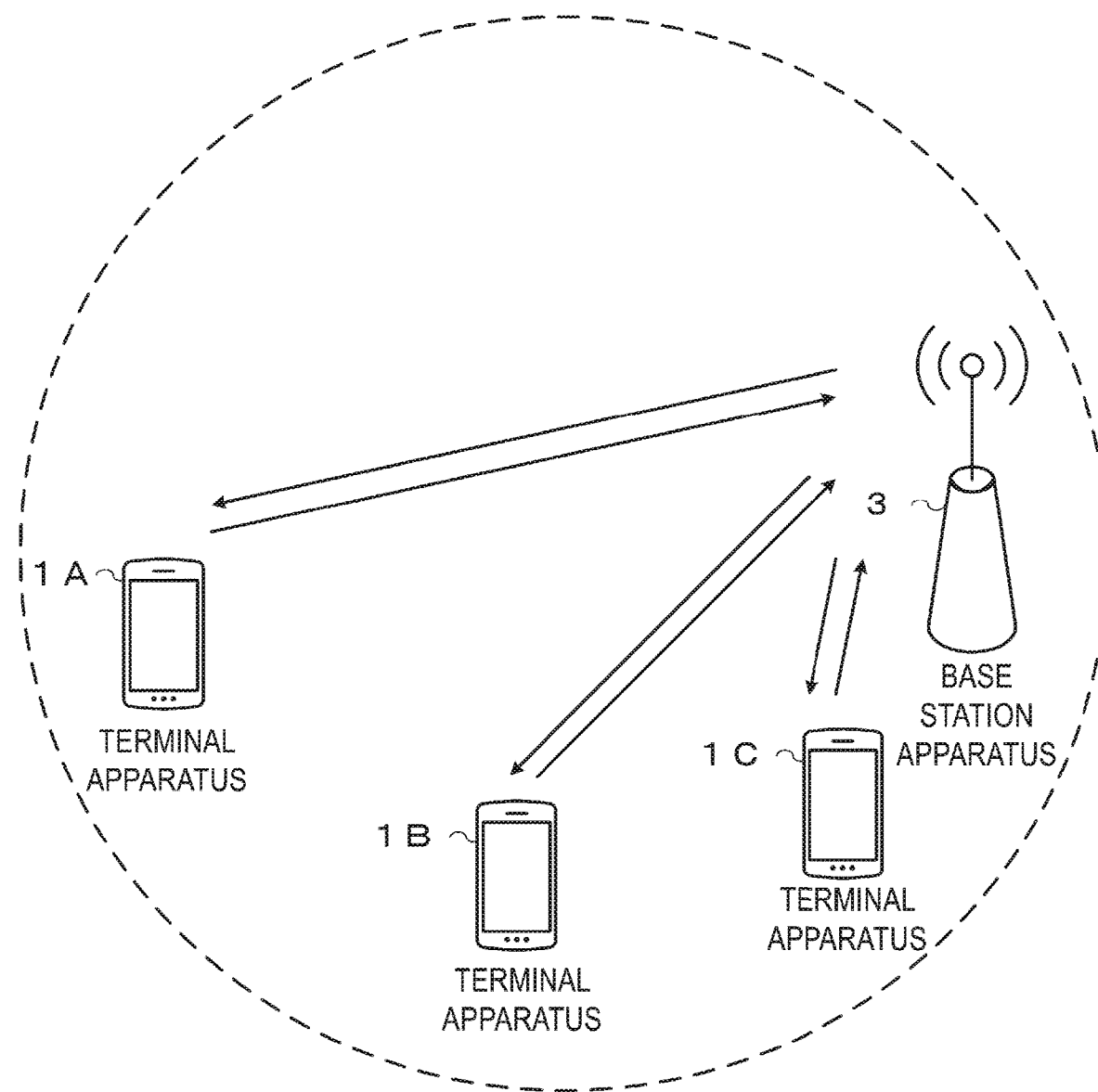
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system at least includes terminal apparatuses 1A to 1C and a base station apparatus 3 (base station #3 (BS #3)). The terminal apparatuses 1A to 1C are hereinafter also referred to as the "terminal apparatus 1" (User Equipment #1 (UE #1)).

The base station apparatus 3 may include one or multiple transmission apparatuses (or transmission points, transmission and/or reception apparatuses, transmission and/or reception points). In a case that the base station apparatus 3 includes multiple transmission apparatuses, each of the multiple transmission apparatuses may be deployed at different positions.

The base station apparatus 3 may provide one or multiple serving cells. The serving cell may be defined as a set of resources used for radio communication. The serving cell is also referred to as a cell.

The serving cell may include one or both of one downlink component carrier (downlink carrier) and one uplink component carrier (uplink carrier). The serving cell may include one or both of two or more downlink component carriers, and two or more uplink component carriers. The downlink component carrier and the uplink component carrier are also collectively referred to as "component carrier (carrier)".

For example, for each component carrier, one resource grid may be provided. For each set of one component carrier and a certain subcarrier spacing configuration μ, one resource grid may be provided. Here, the subcarrier spacing configuration μ is also referred to as numerology. For example, for a set of a certain antenna port p, a certain subcarrier spacing configuration μ, and a certain transmission direction x, one resource grid may be provided.

The resource grid includes $N^{size, \mu}_{grid, x} N^{RB}_{sc}$ subcarriers. Here, the resource grid starts with a common resource block $N^{start, \mu}_{grid, x}$. The common resource block $N^{start, \mu}_{grid, x}$ is also referred to as a reference point of the resource grid.

The resource grid includes $N_{subframe, \mu symb}$ OFDM symbols.

The subscript x added to the parameter related to the resource grid indicates the transmission direction. For example, the subscript x may be used to indicate either of the downlink or the uplink.

$N^{size, \mu}_{grid, x}$ is an offset configuration indicated by a parameter provided by the RRC layer (e.g., a parameter CarrierBandwidth). $N^{start, \mu}_{grid, x}$ is a band configuration indicated by a parameter provided by the RRC layer (e.g., a parameter OffsetToCarrier). The offset configuration and band configuration are used to configure an SCS-specific carrier.

A SubCarrier Spacing (SCS) Δf for a certain subcarrier spacing configuration μ may be $\Delta f = 2^\mu \cdot 15$ kHz. Here, the subcarrier spacing configuration μ may indicate one of 0, 1, 2, 3, or 4.

FIG. 2 is an example illustrating a relationship between the subcarrier spacing configuration μ, the number $N^{slot}_{symb}$ of OFDM symbols per slot, and a cyclic prefix (CP) configuration according to an aspect of the present embodiment. In FIG. 2A, for example, in a case that the subcarrier spacing configuration μ is two and that the CP configuration is a normal cyclic prefix (normal CP), $N^{slot}_{symb}=14$, $N^{frame, \mu}_{slot}=40$, and $N^{subframe, \mu}_{slot}=4$. In FIG. 2B, for example, in a case that the subcarrier spacing configuration μ is two and that the CP configuration is an extended cyclic prefix (extended CP), $N^{slot}_{symb}=12$, $N^{frame, \mu}_{slot}=40$, and $N^{subframe, \mu}_{slot}=4$.

A time unit $T_c$ may be used to express a length in the time domain. The time unit $T_c$ is $T_c=1/(\Delta f_{max} \cdot N_f)$. $\Delta f_{max}=480$ kHz. $N_f=4096$. A constant κ is $\kappa=\Delta f_{max} \cdot N_f/(\Delta f_{ref} N_{f, ref})=64$. $\Delta f_{ref}$ is 15 kHz. $N_{f, ref}$ is 2048.

Transmission of a signal in the downlink and/or transmission of a signal in the uplink may be organized into a radio frame (system frame, frame) having the length $T_f$. $T_f=(\Delta f_{max} N_f/100) \cdot T_s=10$ ms. The radio frame includes 10 subframes. The length $T_{sf}$ of the subframe is $(\Delta f_{max} N_f/1000) \cdot T_s = 1$ ms. The number of OFDM symbols per subframe is $N^{subframe, \mu}_{symb} = N^{slot}_{symb} N^{subframe, \mu}_{slot}$.

The OFDM symbol is a unit of one communication scheme in the time domain. For example, the OFDM symbol may be a unit of CP-OFDM in the time domain. The OFDM symbol may be a unit of DFT-s-OFDM in the time domain.

A slot may include multiple OFDM symbols. For example, $N^{slot}_{symb}$ continuous OFDM symbols may constitute one slot. For example, in the configuration of the normal CP, $N^{slot}_{symb}$ may be $N^{slot}_{symb} = 14$. In the configuration of the extended CP, $N^{slot}_{symb}$ may be $N^{slot}_{symb} = 12$.

For a certain subcarrier spacing configuration $\mu$, the number and indexes of slots included in a subframe may be provided. For example, slot indexes $n^\mu_s$ may be given in ascending order with integer values in the range from 0 to $N^{subframe, \mu}_{slot} - 1$ in the subframe. For the subcarrier spacing configuration $\mu$, the number and indexes of slots included in the radio frame may be given. The slot indexes $n^\mu_{s,f}$ may be given in ascending order with integer values in the range from 0 to $N^{frame, \mu}_{slot} - 1$ in the radio frame.

Figure 3:
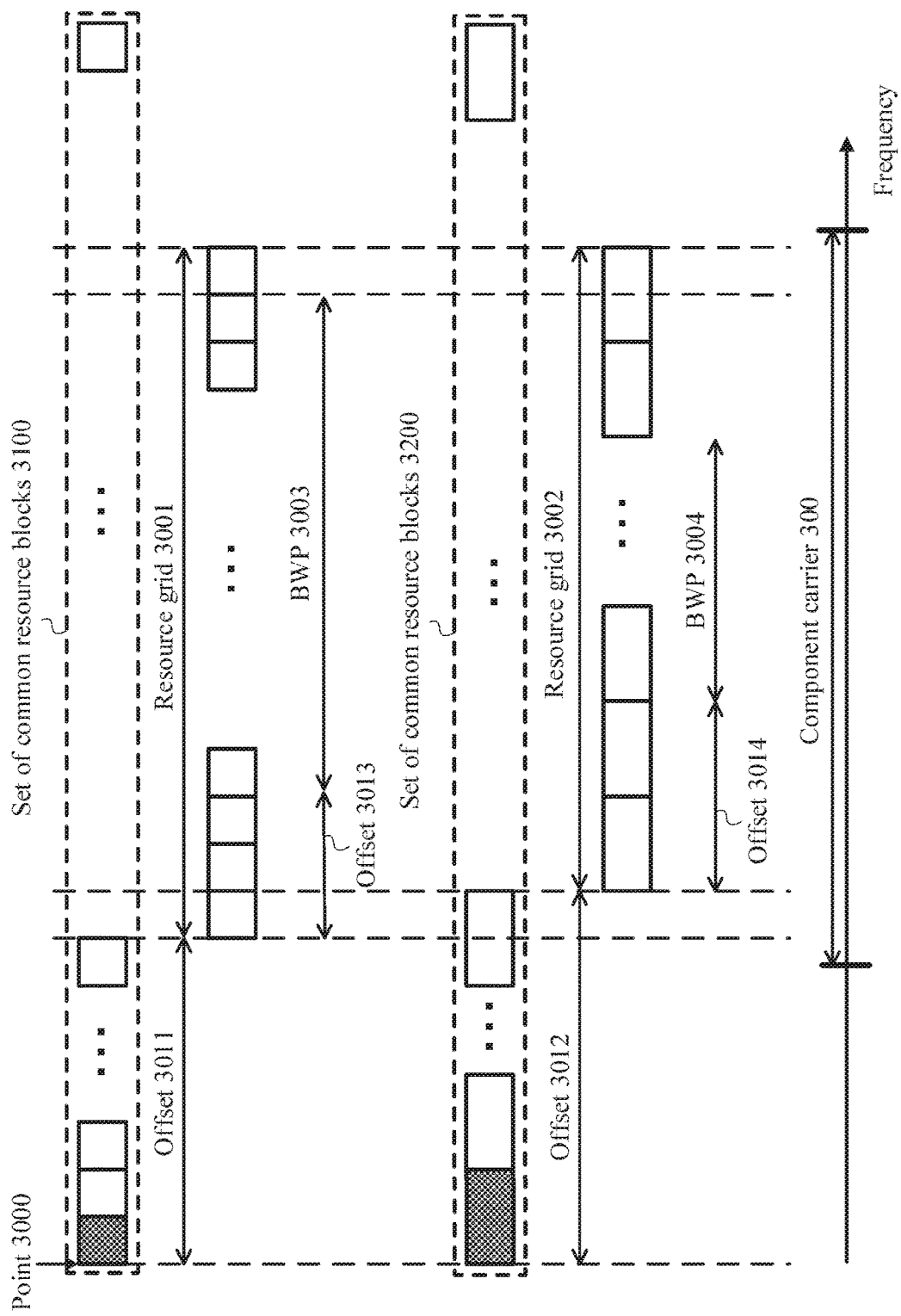
FIG. 3 is a diagram illustrating an example of a configuration method of a resource grid according to an aspect of the present embodiment.

FIG. 3 is a diagram illustrating an example of a configuration method of the resource grid according to an aspect of the present embodiment. The horizontal axis of FIG. 3 represents a frequency domain. FIG. 3 illustrates a configuration example of a resource grid of a subcarrier spacing pi in a component carrier 300, and a configuration example of a resource grid of subcarrier spacing $\mu_2$ in the certain component carrier. As described above, for a certain component carrier, one or multiple subcarrier spacings may be configured. In FIG. 3, it is assumed that $\mu_1 = \mu_2 - 1$. However, various aspects of the present embodiment are not limited to the condition of $\mu_1 = \mu_2 - 1$.

The component carrier 300 is a band having a prescribed width in the frequency domain.

A Point 3000 is an identifier for identifying a certain subcarrier. The point 3000 is also referred to as a point A. A set 3100 of Common resource blocks (CRBs) is a set of common resource blocks for the subcarrier spacing configuration $\mu_1$.

In the common resource block set 3100, a common resource block (solid black block in the common resource block set 3100 in FIG. 3) including the point 3000 is also referred to as a reference point of the common resource block set 3100. The reference point of the common resource block set 3100 may be a common resource block having an index of 0 in the common resource block set 3100.

An offset 3011 is an offset from the reference point of the common resource block set 3100 to a reference point of a resource grid 3001. The offset 3011 is represented by the number of common resource blocks for the subcarrier spacing configuration $\mu_1$. The resource grid 3001 includes $N^{size, \mu}_{grid1, x}$ common resource blocks starting with the reference point of the resource grid 3001.

An offset 3013 is an offset from the reference point of the resource grid 3001 to a reference point $(N^{start, \mu}_{BWP, i1})$ of a BandWidth Part (BWP) 3003 having an index of i1.

A common resource block set 3200 is a set of common resource blocks for the subcarrier spacing configuration $\mu_2$.

In the common resource block set 3200, a common resource block (black solid block in the common resource block set 3200 in FIG. 3) including the point 3000 is also referred to as a reference point of the common resource block set 3200. The reference point of the common resource block set 3200 may be a common resource block having an index of 0 in the common resource block set 3200.

An offset 3012 is an offset from the reference point of the common resource block set 3200 to a reference point of a resource grid 3002. The offset 3012 is indicated by the number of common resource blocks for the subcarrier spacing $\mu_2$. The resource grid 3002 includes $N^{size, \mu}_{grid2, x}$ common resource blocks starting with the reference point of the resource grid 3002.

An offset 3014 is an offset from the reference point of the resource grid 3002 to a reference point $(N^{start, \mu}_{BWP, i2})$ of a BWP 3004 having an index of i2.

Figure 4:
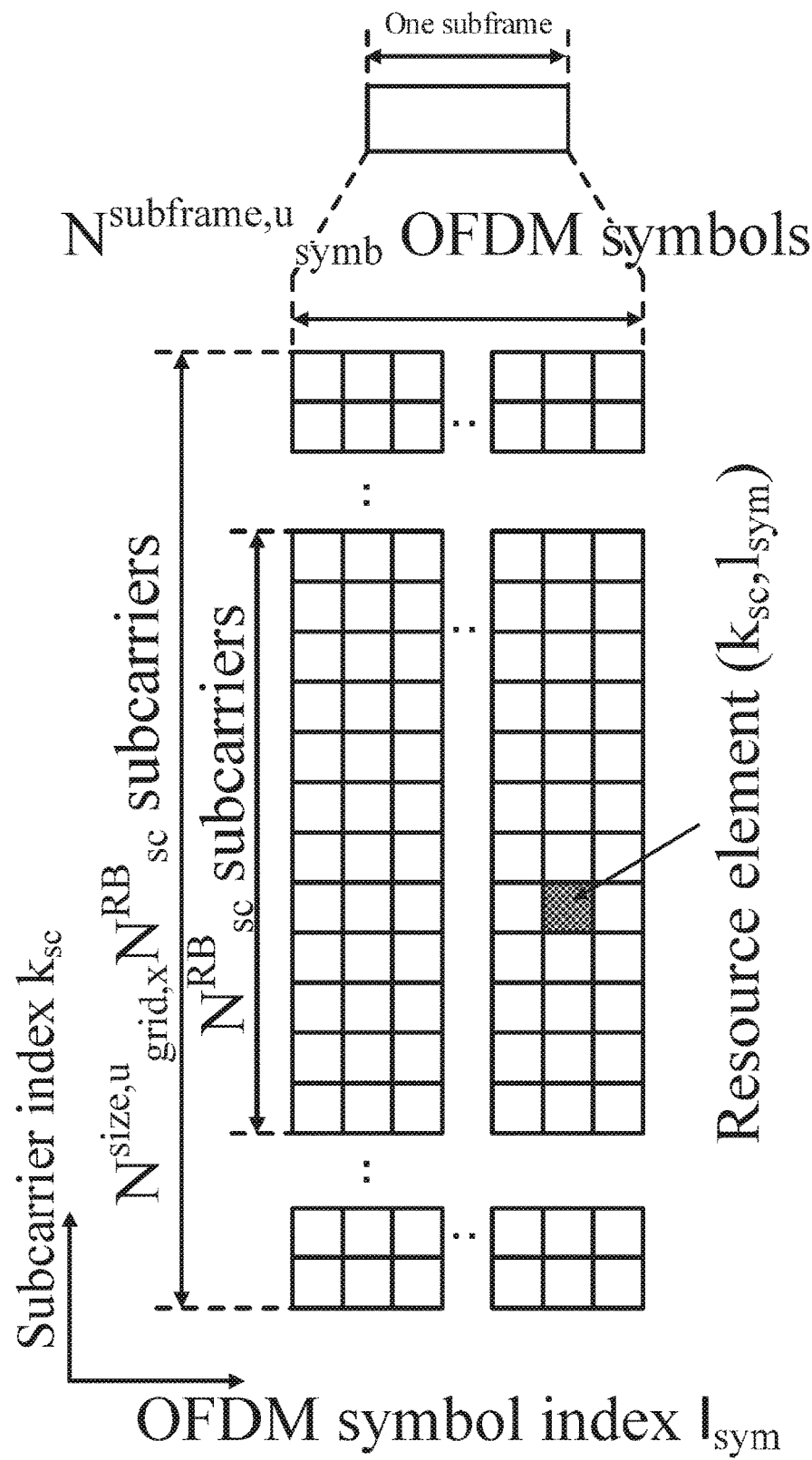
FIG. 4 is a diagram illustrating a configuration example of a resource grid 3001 according to an aspect of the present embodiment.

FIG. 4 is a diagram illustrating a configuration example of the resource grid 3001 according to an aspect of the present embodiment. In the resource grid of FIG. 4, the horizontal axis corresponds to an OFDM symbol index $l_{sym}$, and the vertical axis corresponds to a subcarrier index $k_{sc}$. The resource grid 3001 includes $N^{size, \mu}_{grid1, x} N^{RB}_{sc}$ subcarriers, and $N^{subframe, \mu}_{symb}$ OFDM symbols. In the resource grid, a resource identified with the subcarrier index $k_{sc}$ and the OFDM symbol index $l_{sym}$ is also referred to as a Resource Element (RE).

The Resource Block (RB) includes $N^{RB}_{sc}$ continuous subcarriers. The resource block is a general term for a common resource block, a Physical Resource Block (PRB), and a Virtual Resource Block (VRB). Here, $N^{RB}_{sc} = 12$.

A resource block unit is a set of resources corresponding to one OFDM symbol in one resource block. In other words, one resource block unit includes 12 resource elements corresponding to one OFDM symbol in one resource block.

The common resource blocks for a certain subcarrier spacing configuration $\mu$ are assigned with indexes (indexing) in ascending order from 0 in the frequency domain in a certain common resource block set. The common resource block having an index of 0 for a certain subcarrier spacing configuration $\mu$ includes (or collides with, matches) the point 3000. An index $n^\mu_{CRB}$ of the common resource block for a certain subcarrier spacing configuration $\mu$ satisfies a relationship of $n^\mu_{CRB} = \mathrm{ceil}(k_{sc}/N^{RB}_{sc})$. Here, a subcarrier with $k_{sc} = 0$ is a subcarrier having the same center frequency as the center frequency of a subcarrier corresponding to the point 3000.

The physical resource blocks for a certain subcarrier spacing configuration $\mu$ are assigned with indexes in ascending order from 0 in the frequency domain in a certain BWP. An index $n^\mu_{PRB}$ of the physical resource block for a certain subcarrier spacing configuration $\mu$ satisfies a relationship of $n^\mu_{CRB} = n^\mu_{PRB} + N^{start, \mu}_{BWP, i}$. Here, $N^{start, \mu}_{BWP, i}$ indicates a reference point of the BWP having an index of i.

The BWP is defined as a subset of common resource blocks included in the resource grid. The BWP includes $N^{size, \mu}_{BWP, i}$ common resource blocks starting with the reference point $N^{start, \mu}_{BWP, i}$ of the BWP. A BWP configured for a downlink carrier is also referred to as a downlink BWP. The BWP configured for the uplink component carrier is also referred to as an uplink BWP.

An antenna port may be defined by that a channel on which a symbol in a certain antenna port is delivered can be inferred from a channel on which another symbol in the certain antenna port is delivered (An antenna port is defined such that the channel over which a symbol on the antenna port is conveyed can be inferred from the channel over which another symbol on the same antenna port is conveyed). For example, the channel may correspond to a physical channel. The symbol may correspond to an OFDM symbol. The symbol may correspond to a resource block unit. The symbol may correspond to a resource element.

The fact that large scale property of a channel on which a symbol is delivered in one antenna port can be inferred from a channel on which a symbol is delivered in another antenna port is referred to as two antenna ports being quasi co-located (QCL). Here, the large scale property may at least include long term performance of a channel. The large scale property may at least include a part or all of delay spread, Doppler spread, Doppler shift, an average gain, an average delay, and a beam parameter (spatial Rx parameters). The fact that the first antenna port and the second antenna port are QCL with respect to a beam parameter may mean that a receive beam assumed by a receiver for the first antenna port and a receive beam assumed by the receiver for the second antenna port are the same (or correspond to each other). The fact that the first antenna port and the second antenna port are QCL with respect to a beam parameter may mean that a transmit beam assumed by a receiver for the first antenna port and a transmit beam assumed by the receiver for the second antenna port are the same (or correspond to each other). In a case that the large scale property of a channel through which a symbol is delivered in one antenna port can be inferred from a channel through which a symbol is delivered in another antenna port, the terminal apparatus 1 may assume that the two antenna ports are QCL. The fact that two antenna ports are QCL may mean that it is assumed that the two antenna ports are QCL.

Carrier aggregation may mean that communication is performed by using multiple serving cells being aggregated. Carrier aggregation may mean that communication is performed by using multiple component carriers being aggregated. Carrier aggregation may mean that communication is performed by using multiple downlink component carriers being aggregated. Carrier aggregation may mean that communication is performed by using multiple uplink component carriers being aggregated.

Figure 5:
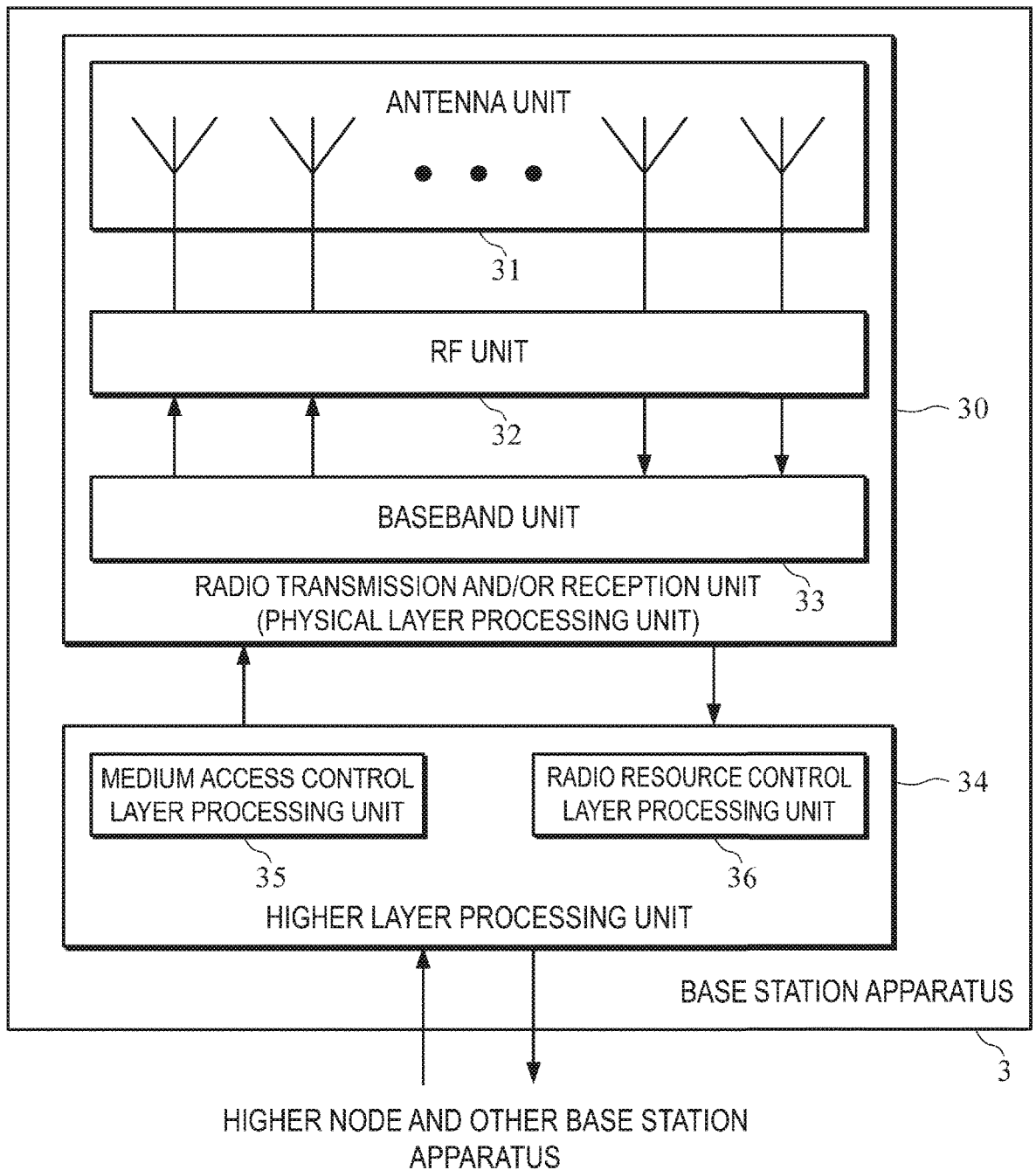
FIG. 5 is a schematic block diagram illustrating a configuration example of a base station apparatus 3 according to an aspect of the present embodiment.

FIG. 5 is a schematic block diagram illustrating a configuration example of the base station apparatus 3 according to an aspect of the present embodiment. As illustrated in FIG. 5, the base station apparatus 3 at least includes a part or all of a radio transmission and/or reception unit (physical layer processing unit) 30 and/or a higher layer processing unit 34. The radio transmission and/or reception unit 30 at least includes a part or all of an antenna unit 31, a Radio Frequency (RF) unit 32, and a baseband unit 33. The higher layer processing unit 34 at least includes a part or all of a medium access control layer processing unit 35 and a Radio Resource Control (RRC) layer processing unit 36.

The radio transmission and/or reception unit 30 at least includes a part or all of a radio transmitting unit 30a and a radio receiving unit 30b. Here, apparatus configurations of the baseband unit included in the radio transmitting unit 30a and the baseband unit included in the radio receiving unit 30b may be the same or different from each other. Apparatus configurations of the RF unit included in the radio transmitting unit 30a and the RF unit included in the radio receiving unit 30b may be the same or different from each other. Apparatus configurations of the antenna unit included in the radio transmitting unit 30a and the antenna unit included in the radio receiving unit 30b may be the same or different from each other.

For example, the radio transmitting unit 30a may generate and transmit a baseband signal of a PDSCH. For example, the radio transmitting unit 30a may generate and transmit a baseband signal of a PDCCH. For example, the radio transmitting unit 30a may generate and transmit a baseband signal of a PBCH. For example, the radio transmitting unit 30a may generate and transmit a baseband signal of a synchronization signal. For example, the radio transmitting unit 30a may generate and transmit a baseband signal of a PDSCH DMRS. For example, the radio transmitting unit 30a may generate and transmit a baseband signal of a PDCCH DMRS. For example, the radio transmitting unit 30a may generate and transmit a baseband signal of a CSI-RS. For example, the radio transmitting unit 30a may generate and transmit a baseband signal of a DL PTRS.

For example, the radio receiving unit 30b may receive a PRACH. For example, the radio receiving unit 30b may receive and demodulate a PUCCH. The radio receiving unit 30b may receive and demodulate a PUSCH. For example, the radio receiving unit 30b may receive a PUCCH DMRS. For example, the radio receiving unit 30b may receive a PUSCH DMRS. For example, the radio receiving unit 30b may receive a UL PTRS. For example, the radio receiving unit 30b may receive an SRS.

The higher layer processing unit 34 outputs downlink data (transport block) to the radio transmission and/or reception unit 30 (or the radio transmitting unit 30a). The higher layer processing unit 34 performs processing of a Medium Access Control (MAC) layer, a Packet Data Convergence Protocol (PDCP) layer, a Radio Link Control (RLC) layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 manages various pieces of configuration information/parameters (RRC parameters) of the terminal apparatus 1. The radio resource control layer processing unit 36 sets the parameter, based on an RRC message received from the terminal apparatus 1.

The radio transmission and/or reception unit 30 (or the radio transmitting unit 30a) performs processing such as modulation and coding. The radio transmission and/or reception unit 30 (or the radio transmitting unit 30a) performs modulation, coding, baseband signal generation (conversion into a time-continuous signal) on downlink data to generate a physical signal, and transmits the physical signal to the terminal apparatus 1. The radio transmission and/or reception unit 30 (or the radio transmitting unit 30a) may map the physical signal to a certain component carrier, and transmit the mapped physical signal to the terminal apparatus 1.

The radio transmission and/or reception unit 30 (or the radio receiving unit 30b) performs processing such as demodulation and decoding. The radio transmission and/or reception unit 30 (or the radio receiving unit 30b) separates, demodulates, and decodes a received physical signal, and outputs decoded information to the higher layer processing unit 34. The radio transmission and/or reception unit 30 (or the radio receiving unit 30b) may perform a channel access procedure prior to transmission of the physical signal.

The RF unit 32 converts (down converts) a signal received via the antenna unit 31 into a baseband signal by means of orthogonal demodulation, and removes unnecessary frequency components. The RF unit 32 outputs a processed analog signal to the baseband unit.

The baseband unit 33 converts an analog signal input from the RF unit 32 into a digital signal. The baseband unit 33 removes a portion corresponding to a Cyclic Prefix (CP) from the converted digital signal, performs a Fast Fourier Transform (FFT) on the signal from which the CP has been removed, and extracts a signal in the frequency domain.

The baseband unit 33 performs inverse fast Fourier transform (IFFT) on data to generate an OFDM symbol, adds a CP to the generated OFDM symbol, generates a baseband digital signal, and converts the baseband digital signal into an analog signal. The baseband unit 33 outputs the converted analog signal to the RF unit 32.

The RF unit 32 removes an unnecessary frequency component from the analog signal input from the baseband unit 33 by using a low-pass filter, up converts the analog signal into a carrier frequency, and transmits the converted analog signal via the antenna unit 31. The RF unit 32 may have a function of controlling transmission power. The RF unit 32 is also referred to as a transmission power control unit.

For the terminal apparatus 1, one or multiple serving cells (or component carriers, downlink component carriers, uplink component carriers) may be configured.

Each of the serving cells configured for the terminal apparatus 1 may be one of a Primary cell (PCell), a Primary SCG cell (PSCell), or a Secondary Cell (SCell).

The PCell is a serving cell included in a Master Cell Group (MCG). The PCell is a cell in which an initial connection establishment procedure or a connection re-establishment procedure is performed (has been performed) by the terminal apparatus 1.

The PSCell is a serving cell included in a Secondary Cell Group (SCG). The PSCell is a serving cell in which a random access is performed by the terminal apparatus 1.

The SCell may be included in one of the MCG or the SCG.

A serving cell group (cell group) is a term at least including an MCG and an SCG. The serving cell group may include one or multiple serving cells (or component carriers). One or multiple serving cells (or component carriers) included in the serving cell group may be operated by means of carrier aggregation.

One or multiple downlink BWPs may be configured for each of the serving cells (or downlink component carriers). One or multiple uplink BWPs may be configured for each of the serving cells (or uplink component carriers).

Among one or multiple downlink BWPs configured for the serving cell (or the downlink component carrier), one downlink BWP may be configured as an active downlink BWP (or one downlink BWP may be activated). Among one or multiple uplink BWPs configured for the serving cell (or the uplink component carrier), one uplink BWP may be configured as an active uplink BWP (or one uplink BWP may be activated).

The PDSCH, the PDCCH, and the CSI-RS may be received in the active downlink BWP. The terminal apparatus 1 may attempt to receive the PDSCH, the PDCCH, and the CSI-RS in the active downlink BWP. The PUCCH and the PUSCH may be transmitted in the active uplink BWP. The terminal apparatus 1 may transmit the PUCCH and the PUSCH in the active uplink BWP. The active downlink BWP and the active uplink BWP are also collectively referred to as an active BWP.

The PDSCH, the PDCCH, and the CSI-RS need not be received in downlink BWPs (inactive downlink BWPs) other than the active downlink BWP. The terminal apparatus 1 need not attempt to receive the PDSCH, the PDCCH, and the CSI-RS in the downlink BWP other than the active downlink BWP. The PUCCH and the PUSCH need not be transmitted in uplink BWPs (inactive uplink BWPs) other than the active uplink BWP. The terminal apparatus 1 need not transmit the PUCCH and the PUSCH in an uplink BWP other than the active uplink BWP. The inactive downlink BWP and the inactive uplink BWP are also collectively referred to as an inactive BWP.

Downlink BWP switch is a procedure for deactivating one active downlink BWP of a certain serving cell, and activating any one of the inactive downlink BWPs of the certain serving cell. The downlink BWP switch may be controlled by a BWP field included in downlink control information. The downlink BWP switch may be controlled based on a higher layer parameter.

Uplink BWP switch is used for deactivating one active uplink BWP, and activating any one of the inactive uplink BWPs other than the one active uplink BWP. The uplink BWP switch may be controlled by a BWP field included in downlink control information. The uplink BWP switch may be controlled based on a higher layer parameter.

Among one or multiple downlink BWPs configured for the serving cell, two or more downlink BWPs need not be configured for the active downlink BWP. For the serving cell, at certain time, one downlink BWP may be active.

Among one or multiple uplink BWPs configured for the serving cell, two or more uplink BWPs need not be configured for the active uplink BWP. For the serving cell, at certain time, one uplink BWP may be active.

Figure 6:
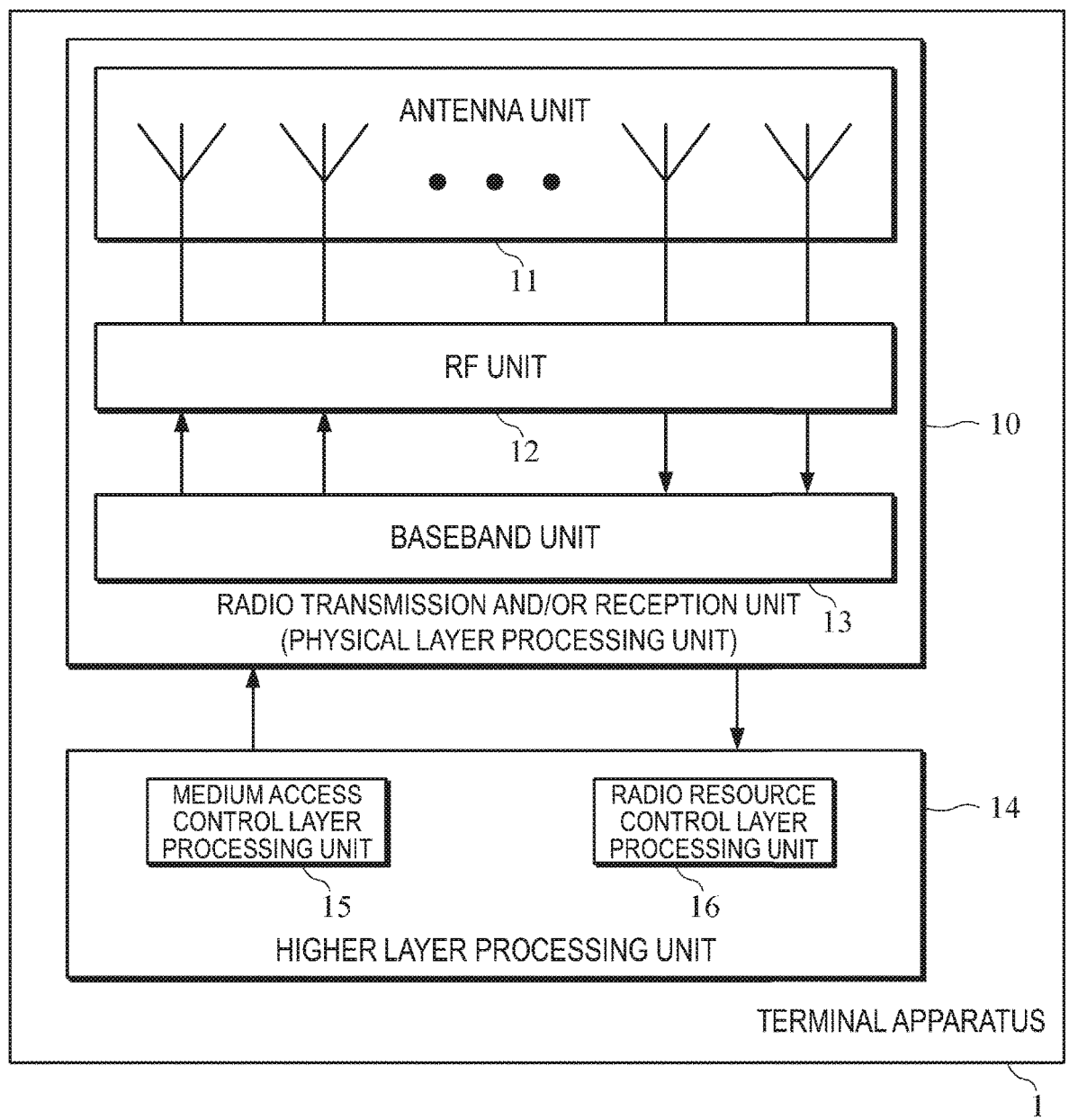
FIG. 6 is a schematic block diagram illustrating a configuration example of a terminal apparatus 1 according to an aspect of the present embodiment.

FIG. 6 is a schematic block diagram illustrating a configuration example of the terminal apparatus 1 according to an aspect of the present embodiment. As illustrated in FIG. 6, the terminal apparatus 1 at least includes one or all of a radio transmission and/or reception unit (physical layer processing unit) 10 and a higher layer processing unit 14. The radio transmission and/or reception unit 10 at least includes a part or all of an antenna unit 11, an RF unit 12, and a baseband unit 13. The higher layer processing unit 14 at least includes a part or all of a medium access control layer processing unit 15 and a radio resource control layer processing unit 16.

The radio transmission and/or reception unit 10 at least includes a part or all of a radio transmitting unit 10a and a radio receiving unit 10b. Here, apparatus configurations of the baseband unit 13 included in the radio transmitting unit 10a and the baseband unit 13 included in the radio receiving unit 10b may be the same or different from each other. Apparatus configurations of the RF unit 12 included in the radio transmitting unit 10a and the RF unit 12 included in the radio receiving unit 10b may be the same or different from each other. Apparatus configurations of the antenna unit 11 included in the radio transmitting unit 10a and the antenna unit 11 included in the radio receiving unit 10b may be the same or different from each other.

For example, the radio transmitting unit 10a may generate and transmit a baseband signal of a PRACH. For example, the radio transmitting unit 10a may generate and transmit a baseband signal of a PUCCH. The radio transmitting unit 10a may generate and transmit a baseband signal of a PUSCH. For example, the radio transmitting unit 10a may generate and transmit a baseband signal of a PUCCH DMRS. For example, the radio transmitting unit 10a may generate and transmit a baseband signal of a PUSCH DMRS. For example, the radio transmitting unit 10a may generate and transmit a baseband signal of a UL PTRS. For example, the radio transmitting unit 10a may generate and transmit a baseband signal of an SRS.

For example, the radio receiving unit 10b may receive and demodulate a PDSCH. For example, the radio receiving unit 10b may receive and demodulate a PDCCH. For example, the radio receiving unit 10b may receive and demodulate a PBCH. For example, the radio receiving unit 10b may receive a synchronization signal. For example, the radio receiving unit 10b may receive a PDSCH DMRS. For example, the radio receiving unit 10b may receive a PDCCH DMRS. For example, the radio receiving unit 10b may receive a CSI-RS. For example, the radio receiving unit 10b may receive a DL PTRS.

The higher layer processing unit 14 outputs uplink data (transport block) to the radio transmission and/or reception unit 10 (or the radio transmitting unit 10a). The higher layer processing unit 14 performs processing of the MAC layer, the packet data convergence protocol layer, the radio link control layer, and the RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various pieces of configuration information/parameters (RRC parameters) of the terminal apparatus 1. The radio resource control layer processing unit 16 sets the RRC parameters, based on an RRC message received from the base station apparatus 3.

The radio transmission and/or reception unit 10 (or the radio transmitting unit 10a) performs processing such as modulation and coding. The radio transmission and/or reception unit 10 (or the radio transmitting unit 10a) performs modulation, coding, baseband signal generation (conversion into a time-continuous signal) on uplink data to generate a physical signal, and transmits the physical signal to the base station apparatus 3. The radio transmission and/or reception unit 10 (or the radio transmitting unit 10a) may map the physical signal to a certain BWP (active uplink BWP), and transmit the mapped physical signal to the base station apparatus 3.

The radio transmission and/or reception unit 10 (or the radio receiving unit 10b) performs processing such as demodulation and decoding. The radio transmission and/or reception unit 10 (or the radio receiving unit 30b) may receive a physical signal in a certain BWP (active downlink BWP) of a certain serving cell. The radio transmission and/or reception unit 10 (or the radio receiving unit 10b) separates, demodulates, and decodes the received physical signal, and outputs decoded information to the higher layer processing unit 14. The radio transmission and/or reception unit 10 (radio receiving unit 10b) may perform a channel access procedure prior to transmission of the physical signal.

The RF unit 12 converts (down converts) a signal received via the antenna unit 11 into a baseband signal by means of orthogonal demodulation, and removes an unnecessary frequency component. The RF unit 12 outputs a processed analog signal to the baseband unit 13.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed, and extracts a signal in the frequency domain.

The baseband unit 13 performs inverse fast Fourier transform (IFFT) on uplink data to generate an OFDM symbol, adds a CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 through a low-pass filter, up converts the analog signal into a signal of a carrier frequency, and transmits the up converted signal via the antenna unit 11. The RF unit 12 may have a function of controlling transmission power. The RF unit 12 is also referred to as a transmission power control unit.

The physical signal (signal) will be described below.

The physical signal is a general term for a downlink physical channel, a downlink physical signal, an uplink physical channel, and an uplink physical channel. The physical channel is a general term for a downlink physical channel and an uplink physical channel. The physical signal is a general term for a downlink physical signal and an uplink physical signal.

The uplink physical channel may correspond to a set of resource elements for delivering information that occurs in a higher layer. The uplink physical channel may be a physical channel used in the uplink component carrier. The uplink physical channel may be transmitted by the terminal apparatus 1. The uplink physical channel may be received by the base station apparatus 3. In the radio communication system according to an aspect of the present embodiment, at least a part or all of the following uplink physical channels may be used.

Physical Uplink Control CHannel (PUCCH)
Physical Uplink Shared CHannel (PUSCH)
Physical Random Access CHannel (PRACH)

The PUCCH may be used to transmit Uplink Control Information (UCI). The PUCCH may be transmitted for delivering (transmitting, conveying) the uplink control information. The uplink control information may be mapped to the PUCCH. The terminal apparatus 1 may transmit the PUCCH to which the uplink control information is mapped. The base station apparatus 3 may receive the PUCCH to which the uplink control information is mapped.

The uplink control information (uplink control information bit(s), uplink control information sequence, uplink control information type) at least includes a part or all of Channel State Information (CSI), a Scheduling Request (SR), and Hybrid Automatic Repeat reQuest Acknowledgement (HARQ-ACK) information.

The channel state information is also referred to as channel state information bit(s) or a channel state information sequence. The scheduling request is also referred to as a scheduling request bit or a scheduling request sequence. The HARQ-ACK information is also referred to as HARQ-ACK information bit(s) or an HARQ-ACK information sequence.

The HARQ-ACK information may include at least an HARQ-ACK corresponding to a transport block (TB). The HARQ-ACK may indicate an acknowledgement (ACK) or a negative-acknowledgement (NACK) corresponding to the transport block. The ACK may indicate that decoding of the transport block has been completed successfully (has been decoded). The NACK may indicate that decoding of the transport block has not completed successfully (has not been decoded). The HARQ-ACK information may include an HARQ-ACK codebook including one or multiple HARQ-ACK bits.

The transport block is a sequence of information bits delivered from the higher layer. In this regard, the sequence of information bits is also referred to as a bit sequence. In this regard, the transport block may be delivered from the UpLink-Shared CHannel (UL-SCH) of the transport layer.

The HARQ-ACK for the transport block may be referred to as a HARQ-ACK for the PDSCH. In this case, the "HARQ-ACK for the PDSCH" indicates the HARQ-ACK for the transport block included in the PDSCH.

The HARQ-ACK may indicate an ACK or a NACK corresponding to one Code Block Group (CBG) included in the transport block.

The scheduling request may be at least used for requesting a resource of the UL-SCH for a new transmission. The scheduling request bit may be used for indicating either of a positive SR or a negative SR. The scheduling request bit indicating the positive SR is also referred to as "the positive SR being delivered". The positive SR may indicate that resources of the UL-SCH for the new transmission are requested by the terminal apparatus 1. The positive SR may indicate that the scheduling request is triggered by the higher layer. The positive SR may be delivered in a case that the higher layer indicates the scheduling request. The scheduling request bit indicating the negative SR is also referred to as "the negative SR being transmitted". The negative SR may indicate that resources of the UL-SCH for the new transmission are not requested by the terminal apparatus 1. The negative SR may indicate that the scheduling request is not triggered by the higher layer. The negative SR may be delivered in a case that the scheduling request is not indicated by the higher layer.

Channel state information may include at least some or all of a Channel Quality Indicator (CQI), a Precoder Matrix Indicator (PMI), and a Rank Indicator (RI). The CQI is an indicator related to quality (for example, propagation strength) of a channel or quality of a physical channel, and the PMI is an indicator related to a precoder. The RI is an indicator related to a transmission rank (or the number of transmission layers).

The channel state information is an indicator related to a reception state of a physical signal (for example, a CSI-RS) at least used for channel measurement. The value of the channel state information may be determined by the terminal apparatus 1, based on the reception state assumed with the physical signal at least used for channel measurement. Channel measurement may include interference measurement.

The PUCCH may correspond to a PUCCH format. The PUCCH may be a set of resource elements used for delivering the PUCCH format. The PUCCH may include the PUCCH format. The PUCCH may be transmitted along with a certain PUCCH format. Note that the PUCCH format may be interpreted as a form of information. The PUCCH format may be interpreted as a set of information set in a form of a certain information.

The PUSCH may be used for delivering one or both of the transport block and the uplink control information. The transport block may be mapped to the PUSCH. The transport block delivered by the UL-SCH may be mapped to the PUSCH. The uplink control information may be mapped to the PUSCH. The terminal apparatus 1 may transmit the PUSCH to which one or both of the transport block and the uplink control information are mapped. The base station apparatus 3 may receive the PUSCH to which one or both of the transport block and the uplink control information are mapped.

The PRACH may be transmitted to deliver a random access preamble. The terminal apparatus 1 may transmit the PRACH. The base station apparatus 3 may receive the PRACH. A PRACH sequence $x_{u,v}(n)$ is defined by $x_{u,v}(n) = x_u(\mathrm{mod}(n+C_v, L_{RA}))$. Here, $x_u$ is a Zadoff-Chu (ZC) sequence. $x_u$ may be defined by $x_u = \exp(-j\pi u i (i+1)/L_{RA})$. j is an imaginary unit. π is ratio of the circumference of a circle to its diameter. $C_v$ corresponds to a cyclic shift of the PRACH sequence. $L_{RA}$ corresponds to the length of the PRACH sequence. $L_{RA}$ is 839, or 139. i is an integer in the range from 0 to $L_{RA}-1$. u is a sequence index for the PRACH sequence.

For each PRACH occasion, 64 random access preambles are defined. The random access preamble is identified based on the cyclic shift $C_v$ of the PRACH sequence and the sequence index u for the PRACH sequence. An index may be assigned to each of 64 random access preambles identified.

The uplink physical signal may correspond to a set of resource elements. The uplink physical signal need not be used to deliver information that occurs in the higher layer. Note that the uplink physical signal may be used to deliver information that occurs in the physical layer. The uplink physical signal may be a physical signal used in the uplink component carrier. The terminal apparatus 1 may transmit the uplink physical signal. The base station apparatus 3 may receive the uplink physical signal. In the radio communication system according to an aspect of the present embodiment, at least a part or all of the following uplink physical signals may be used.

UpLink Demodulation Reference Signal (UL DMRS)
Sounding Reference Signal (SRS)
UpLink Phase Tracking Reference Signal (UL PTRS)

The UL DMRS is a general term for a DMRS for the PUSCH and a DMRS for the PUCCH.

A set of antenna ports of the DMRS for the PUSCH (DMRS related to the PUSCH, DMRS included in the PUSCH, DMRS corresponding to the PUSCH) may be given based on a set of antenna ports for the PUSCH. For example, the set of antenna ports of the DMRS for the PUSCH may be the same as a set of antenna ports of the PUSCH.

Transmission of the PUSCH and transmission of the DMRS for the PUSCH may be indicated by one DCI format (or may be scheduled). The PUSCH and the DMRS for the PUSCH may be collectively referred to as a PUSCH. Transmission of the PUSCH may mean transmission of the PUSCH and the DMRS for the PUSCH.

A channel (propagation path) of the PUSCH may be inferred from the DMRS for the PUSCH.

A set of antenna ports of the DMRS for the PUCCH (DMRS related to the PUCCH, DMRS included in the PUCCH, DMRS corresponding to the PUCCH) may be the same as a set of antenna ports of the PUCCH.

Transmission of the PUCCH and transmission of the DMRS for the PUCCH may be indicated by one DCI format (or may be triggered). One or both of mapping of the PUCCH to resource elements (resource element mapping) and mapping of the DMRS for the PUCCH to resource elements may be given by one PUCCH format. The PUCCH and the DMRS for the PUCCH may be collectively referred to as a PUCCH. Transmission of the PUCCH may mean transmission of the PUCCH and the DMRS for the PUCCH.

The channel of the PUCCH may be inferred from the DMRS for the PUCCH.

The downlink physical channel may correspond to a set of resource elements for delivering information that occurs in a higher layer. The downlink physical channel may be a physical channel used in a downlink component carrier. The base station apparatus 3 may transmit the downlink physical channel. The terminal apparatus 1 may receive the downlink physical channel. In the radio communication system according to an aspect of the present embodiment, at least a part or all of the following downlink physical channels may be used.

Physical Broadcast Channel (PBCH)

Physical Downlink Control Channel (PDCCH)

Physical Downlink Shared Channel (PDSCH)

The PBCH may be transmitted to deliver one or both of a Master Information Block (MIB) and physical layer control information. In this regard, the physical layer control information is information that occurs in the physical layer. The MIB is a set of parameters that are mapped to the BCCH (Broadcast Control CHannel), which is a logical channel of the MAC layer. The BCCH is mapped to the BCH, which corresponds to a channel of the transport layer. The BCH may be mapped to the PBCH. The terminal apparatus 1 may receive the PBCH to which one or both of the MIB and the physical layer control information are mapped. The base station apparatus 3 may transmit the PBCH to which one or both of the MIB and the physical layer control information are mapped.

For example, the physical layer control information may be configured in 8 bits. The physical layer control information may at least include a part or all of the following 0A to 0D.

0A) Radio frame bit

0B) Half radio frame (half system frame, half frame) bit

0C) SS/PBCH block index bit

0D) Subcarrier offset bit

The radio frame bit is used for indicating a radio frame in which the PBCH is transmitted (radio frame including a slot in which the PBCH is transmitted). The radio frame bit includes 4 bits. The radio frame bit may include 4 bits of a 10-bit radio frame indicator. For example, the radio frame indicator may be at least used for identifying radio frames from index 0 to index 1023.

The half radio frame bit is used for indicating, out of the radio frame in which the PBCH is transmitted, which of the first five subframes or the last five subframes is used for transmission of the PBCH. Here, the half radio frame may include five subframes. The half radio frame may include the first five subframes out of the 10 subframes included in the radio frame. The half radio frame may include the last five subframes out of the 10 subframes included in the radio frame.

The SS/PBCH block index bit is used for indicating an SS/PBCH block index. The SS/PBCH block index bit includes 3 bits. The SS/PBCH block index bit may include 3 bits of a 6-bit SS/PBCH block index indicator. The SS/PBCH block index indicator may be at least used for identifying SS/PBCH blocks from index 0 to index 63.

The subcarrier offset bit is used for indicating a subcarrier offset. The subcarrier offset may be used for indicating a difference between the first subcarrier to which the PBCH is mapped and the first subcarrier to which the control resource set having an index of 0 is mapped.

The PDCCH may be transmitted to deliver Downlink Control Information (DCI). The downlink control information may be mapped to the PDCCH. The terminal apparatus 1 may receive the PDCCH to which the downlink control information is mapped. The base station apparatus 3 may transmit the PDCCH to which the downlink control information is mapped.

The downlink control information may be transmitted along with the DCI format. Note that the DCI format may be interpreted as a form of the downlink control information. The DCI format may be interpreted as a set of downlink control information set in a form of certain downlink control information.

The downlink control information may be used for activation or deactivation of Semi-Persistent Scheduling (SPS).

The downlink control information may be used for activation or deactivation of configured grant type 2.

DCI format 0_0, DCI format 0_1, DCI format 1_0, and DCI format 1_1 are DCI formats. An uplink DCI format is a general term for DCI format 0_0 and DCI format 0_1. A downlink DCI format is a general term for DCI format 1_0 and DCI format 1_1.

DCI format 0_0 is at least used for scheduling of the PUSCH mapped to a certain cell. DCI format 0_0 includes at least some or all of the fields 1A to 1H.

1A) DCI format identification field (Identifier field for DCI formats)

1B) Frequency domain resource allocation field (Frequency domain resource assignment field)

1C) Time domain resource allocation field (Time domain resource assignment field)

1D) Frequency hopping flag field

1E) Modulation and Coding Scheme field (MCS field)

1F) New data indicator field (NDI field)

1G) Redundancy version field (RV field)

1H) HARQ process number field

The DCI format identification field may indicate whether the DCI format including the DCI format identification field is an uplink DCI format or a downlink DCI format. In other words, the DCI format identification field may be included in each of the uplink DCI format and the downlink DCI format. In this regard, the DCI format identification field included in DCI format 0_0 may indicate 0.

The frequency domain resource allocation field included in DCI format 0_0 may be used for indicating allocation of frequency resources for the PUSCH.

The time domain resource allocation field included in DCI format 0_0 may be used for indicating allocation of time resources for the PUSCH.

The frequency hopping flag field may be used for indicating whether frequency hopping is applied to the PUSCH.

The NDI field may be used to indicate whether the data is new. For example, the NDI field may be used to determine whether a channel scheduled by the DCI format including the NDI field corresponds to new data.

The MCS field included in DCI format 0_0 may be at least used for indicating one or both of a modulation scheme for the PUSCH and a target coding rate. The target coding rate may be a target coding rate for the transport block mapped to the PUSCH. The size of the transport block (Transport Block Size (TBS)) mapped to the PUSCH may be determined based on one or both of the target coding rate and the modulation scheme for the PUSCH.

DCI format 0_0 need not include a field used for a CSI request.

DCI format 0_0 need not include a carrier indicator field. In other words, the serving cell to which the uplink component carrier to which the PUSCH scheduled using DCI format 0_0 is mapped belongs may be the same as the serving cell of the uplink component carrier to which the PDCCH including DCI format 0_0 is mapped. The terminal apparatus 1 may recognize, based on detection of DCI format 0_0 in a certain downlink component carrier in a certain serving cell, that the PUSCH scheduled by DCI format 0_0 is mapped to an uplink component carrier of the certain serving cell.

DCI format 0_0 need not include the BWP field. In this regard, DCI format 0_0 may be a DCI format for scheduling the PUSCH with no change in the active uplink BWP. The terminal apparatus 1 may recognize, based on detection of DCI format 0_0 used for scheduling of the PUSCH, that the PUSCH is transmitted without switching the active uplink BWP.

DCI format 0_1 is at least used for scheduling of the PUSCH mapped to a certain cell. DCI format 0_1 includes at least some or all of the fields 2A to 2K.

2A) DCI format identification field
2B) Frequency domain resource allocation field
2C) Uplink time domain resource allocation field
2D) Frequency hopping flag field
2E) MCS field
2F) CSI request field
2G) BWP field
2H) Carrier indicator field
2I ) New data indicator field (NDI field)
2J) Redundancy version field (RV field)
2K) HARQ process number field The DCI format identification field included in DCI format 0_1 may indicate 0.

The frequency domain resource allocation field included in DCI format 0_1 may be used for indicating allocation of frequency resources for the PUSCH.

The time domain resource allocation field included in DCI format 0_1 may be used for indicating allocation of time resources for the PUSCH.

The MCS field included in DCI format 0_1 may be at least used for indicating a part or all of a modulation scheme for the PUSCH and/or a target coding rate.

The BWP field of DCI format 0_1 may be used for indicating the uplink BWP to which the PUSCH scheduled by DCI format 0_1 is mapped. In other words, the DCI format 0_1 may involve a change in the active uplink BWP. The terminal apparatus 1 may recognize, based on detection of the DCI format 0_1 used for scheduling of the PUSCH, the uplink BWP to which the PUSCH is mapped.

DCI format 0_1 that does not include the BWP field may be a DCI format for scheduling the PUSCH with no change in the active uplink BWP. The terminal apparatus 1 may recognize that the PUSCH is transmitted without switching the active uplink BWP, based on detection of DCI format 0_1, which is used for scheduling of the PUSCH and which does not include the BWP field.

Although DCI format 0_1 includes the BWP field, the BWP field may be disregarded by the terminal apparatus 1 in a case that the terminal apparatus 1 does not support the function of switching the BWP by DCI format 0_1. In other words, the terminal apparatus 1 that does not support the function of switching the BWP may recognize that the PUSCH is transmitted without switching the active uplink BWP, based on detection of DCI format 0_1, which is used for scheduling of the PUSCH and which includes the BWP field. In this regard, in a case that the terminal apparatus 1 supports the function of switching the BWP, the terminal apparatus 1 may report, in a function information reporting procedure of the RRC layer, that "the terminal apparatus 1 supports the function of switching the BWP".

The CSI request field is used for indicating the report of the CSI.

In a case that the carrier indicator field is included in DCI format 0_1, the carrier indicator field may be used for indicating the uplink component carrier to which the PUSCH is mapped. In a case that the carrier indicator field is not included in DCI format 0_1, the uplink component carrier to which the PUSCH is mapped may be the same as the uplink component carrier to which the PDCCH including DCI format 0_1 used for scheduling of the PUSCH is mapped. In a case that the number of uplink component carriers configured for the terminal apparatus 1 in a certain serving cell group is two or more (case that uplink carrier aggregation is operated in a certain serving cell group), the number of bits of the carrier indicator field included in DCI format 0_1 used for scheduling of the PUSCH mapped to the certain serving cell group may be 1 bit or more (for example, 3 bits). In a case that the number of uplink component carriers configured for the terminal apparatus 1 in a certain serving cell group is one (case that uplink carrier aggregation is not operated in a certain serving cell group), the number of bits of the carrier indicator field included in DCI format 0_1 used for scheduling of the PUSCH mapped to the certain serving cell group may be 0 bits (or the carrier indicator field need not be included in DCI format 0_1 used for scheduling of the PUSCH mapped to the certain serving cell group).

DCI format 1_0 is at least used for scheduling of the PDSCH mapped to a certain cell. DCI format 1_0 includes at least some or all of 3A to 3I.

3A) DCI format identification field
3B) Frequency domain resource allocation field
3C) Time domain resource allocation field
3D) MCS field
3E) PDSCH_HARQ feedback timing indication field (PDSCH to HARQ feedback timing indication field)
3F) PUCCH resource indication field (PUCCH resource indicator field)
3G) New data indicator field (NDI field)
3H) Redundancy version field (RV field)
3I) HARQ process number field The DCI format identification field included in DCI format 1_0 may indicate 1.

The frequency domain resource allocation field included in DCI format 1_0 may be at least used for indicating allocation of frequency resources for the PDSCH.

The time domain resource allocation field included in DCI format 1_0 may be at least used for indicating allocation of time resources for the PDSCH.

The MCS field included in DCI format 1_0 may be at least used for indicating one or both of the modulation scheme for the PDSCH and the target coding rate. The target coding rate may be a target coding rate for the transport block mapped to the PDSCH. The size of the transport block (Transport Block Size (TBS)) mapped to the PDSCH may be determined based on one or both of the target coding rate and the modulation scheme for the PDSCH.

The PDSCH_HARQ feedback timing indication field may be at least used for indicating an offset from the slot including the last OFDM symbol of the PDSCH to the slot including the first OFDM symbol of the PUCCH.

The PUCCH resource indication field may be a field indicating an index of one of one or multiple PUCCH resources included in a PUCCH resource set. The PUCCH resource set may include one or multiple PUCCH resources.

DCI format 1_0 need not include the carrier indicator field. In other words, the downlink component carrier to which the PDSCH scheduled using DCI format 1_0 is mapped may be the same as the downlink component carrier to which the PDCCH including DCI format 1_0 is mapped. The terminal apparatus 1 may recognize, based on detection of DCI format 1_0 in a certain downlink component carrier, that the PDSCH scheduled by DCI format 1_0 is mapped to the downlink component carrier.

DCI format 1_0 need not include the BWP field. In this regard, DCI format 1_0 may be a DCI format for scheduling the PDSCH with no change in the active downlink BWP. The terminal apparatus 1 may recognize, based on detection of DCI format 1_0 used for scheduling of the PDSCH, that the PDSCH is received without switching the active downlink BWP.

DCI format 1_1 is at least used for scheduling of the PDSCH mapped to a certain cell. DCI format 1_1 includes at least some or all of 4A to 4L.

4A) DCI format identification field
4B) Frequency domain resource allocation field
4C) Time domain resource allocation field
4E) MCS field
4F) PDSCH_HARQ feedback timing indication field
4G) PUCCH resource indication field
4H) BWP field
4I) Carrier indicator field
4J) New data indicator field (NDI field)
4K) Redundancy version field (RV field)
4L) HARQ process number field The DCI format identification field included in DCI format 1_1 may indicate 1.

The frequency domain resource allocation field included in DCI format 1_1 may be at least used for indicating allocation of frequency resources for the PDSCH.

The time domain resource allocation field included in DCI format 1_1 may be at least used for indicating allocation of time resources for the PDSCH.

The MCS field included in DCI format 1_1 may be at least used for indicating one or both of the modulation scheme for the PDSCH and the target coding rate.

In a case that the PDSCH_HARQ feedback timing indication field is included in DCI format 1_1, the PDSCH_HARQ feedback timing indication field may be at least used for indicating an offset from the slot including the last OFDM symbol of the PDSCH to the slot including the first OFDM symbol of the PUCCH. In a case that the PDSCH_HARQ feedback timing indication field is not included in DCI format 1_1, an offset from the slot including the last OFDM symbol of the PDSCH to the slot including the first OFDM symbol of the PUCCH may be identified by a higher layer parameter.

The PUCCH resource indication field may be a field indicating an index of one of one or multiple PUCCH resources included in a PUCCH resource set.

The BWP field of DCI format 1_1 may be used to indicate the downlink BWP to which the PDSCH scheduled by DCI format 1_1 is mapped. In other words, DCI format 1_1 may involve a change in the active downlink BWP. The terminal apparatus 1 may recognize the downlink BWP to which the PUSCH is mapped, based on detection of DCI format 1_1 used for scheduling of the PDSCH.

DCI format 1_1 not including the BWP field may be a DCI format for scheduling the PDSCH with no change in the active downlink BWP. The terminal apparatus 1 may recognize that the PDSCH is received without switching the active downlink BWP, based on detection of DCI format 1_1, which is used for scheduling of the PDSCH and which does not include the BWP field.

Although DCI format 1_1 includes the BWP field, the BWP field may be disregarded by the terminal apparatus 1 in a case that the terminal apparatus 1 does not support the function of switching the BWP by DCI format 1_1. In other words, the terminal apparatus 1 that does not support the function of switching the BWP may recognize that the PDSCH is received without switching the active downlink BWP, based on detection of DCI format 1_1, which is used for scheduling of the PDSCH and which includes the BWP field. In this regard, in a case that the terminal apparatus 1 supports the function of switching the BWP, the terminal apparatus 1 may report, in the function information reporting procedure of the RRC layer, that "the terminal apparatus 1 supports the function of switching the BWP".

In a case that the carrier indicator field is included in DCI format 1_1, the carrier indicator field may be used for indicating the downlink component carrier to which the PDSCH is mapped. In a case that the carrier indicator field is not included in DCI format 1_1, the downlink component carrier to which the PDSCH is mapped may be the same as the downlink component carrier to which the PDCCH including DCI format 1_1 used for scheduling of the PDSCH is mapped. In a case that the number of downlink component carriers configured for the terminal apparatus 1 in a certain serving cell group is two or more (case that downlink carrier aggregation is operated in a certain serving cell group), the number of bits of the carrier indicator field included in DCI format 1_1 used for scheduling of the PDSCH mapped to the certain serving cell group may be 1 bit or more (for example, 3 bits). In a case that the number of downlink component carriers configured for the terminal apparatus 1 in a certain serving cell group is one (case that downlink carrier aggregation is not operated in a certain serving cell group), the number of bits of the carrier indicator field included in DCI format 1_1 used for scheduling of the PDSCH mapped to the certain serving cell group may be 0 bits (or the carrier indicator field need not be included in DCI format 1_1 used for scheduling of the PDSCH mapped to the certain serving cell group).

The PDSCH may be transmitted to deliver the transport block. The PDSCH may be used for transmitting the transport block delivered by the DL-SCH. The PDSCH may be used for delivering the transport block. The transport block may be mapped to the PDSCH. The transport block corresponding to the DL-SCH may be mapped to the PDSCH. The base station apparatus 3 may transmit the PDSCH. The terminal apparatus 1 may receive the PDSCH.

The downlink physical signal may correspond to a set of resource elements. The downlink physical signal need not carry information that occurs in the higher layer. The downlink physical signal may be a physical signal used in the downlink component carrier. The downlink physical signal may be transmitted by the base station apparatus 3. The downlink physical signal may be transmitted by the terminal apparatus 1. In the radio communication system according to an aspect of the present embodiment, at least a part or all of the following downlink physical signals may be used.

Synchronization Signal (SS)
DownLink DeModulation Reference Signal (DL DMRS)
Channel State Information-Reference Signal (CSI-RS)
DownLink Phase Tracking Reference Signal (DL PTRS)

The synchronization signal may be used for the terminal apparatus 1 to make synchronization in one or both of the frequency domain and the time domain in the downlink. The synchronization signal is a general term for the Primary Synchronization Signal (PSS) and the Secondary Synchronization Signal (SSS).

Figure 7:
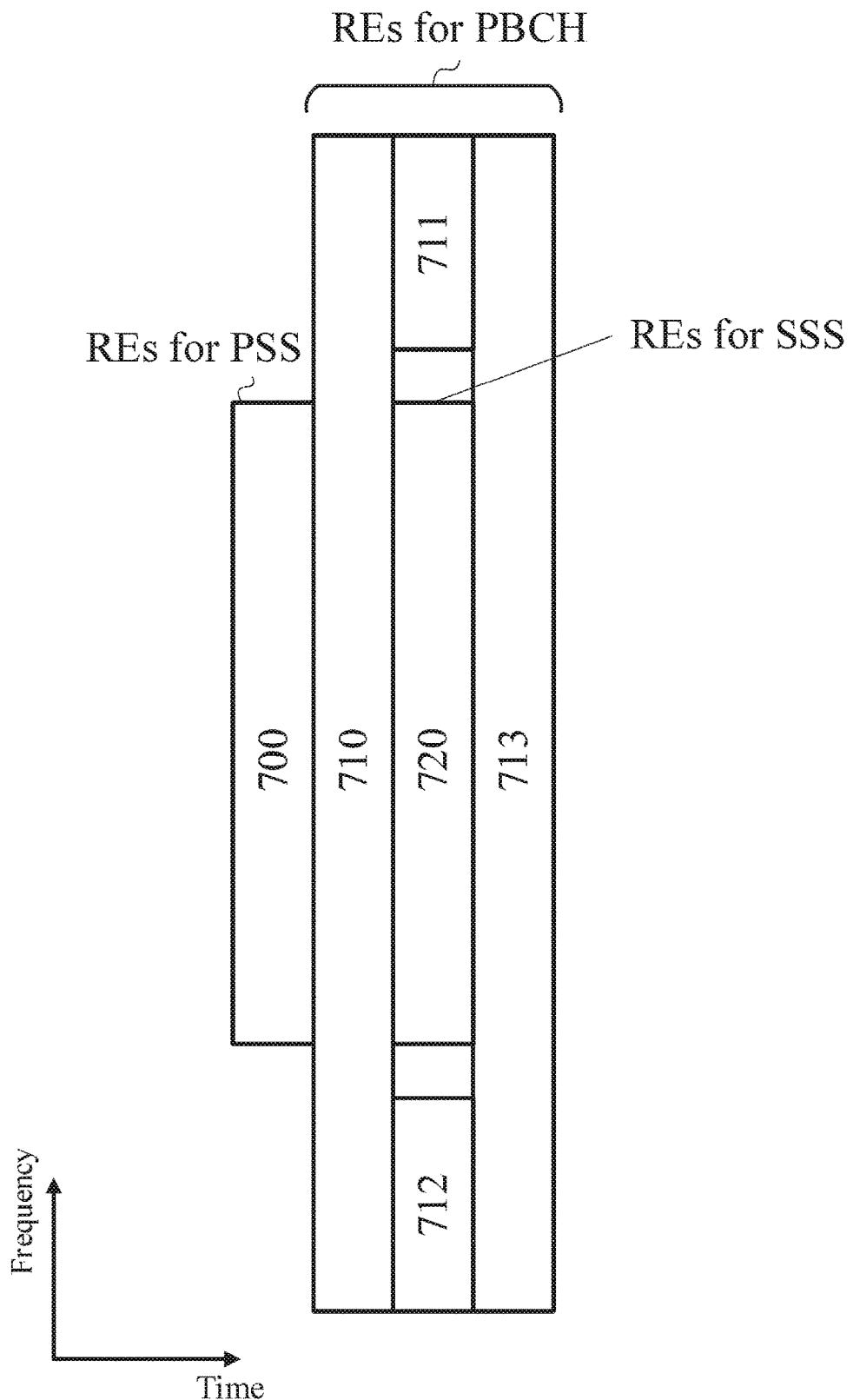
FIG. 7 is a diagram illustrating a configuration example of an SS/PBCH block according to an aspect of the present embodiment.

FIG. 7 is a diagram illustrating a configuration example of the SS/PBCH block according to an aspect of the present embodiment. In FIG. 7, the horizontal axis corresponds to a time axis (OFDM symbol index $l_{sym}$), and the vertical axis represents the frequency domain. A block 700 represents a set of resource elements for the PSS. A block 720 represents a set of resource elements for the SSS. Four blocks (blocks 710, 711, 712, and 713) represent a set of resource elements for the PBCH and the DMRS for the PBCH (DMRS related to the PBCH, DMRS included in the PBCH, DMRS corresponding to the PBCH).

As illustrated in FIG. 7, the SS/PBCH block includes the PSS, the SSS, and the PBCH. The SS/PBCH block includes four continuous OFDM symbols. The SS/PBCH block includes 240 subcarriers. The PSS is mapped to the 57th to 183rd subcarriers in the first OFDM symbol. The SSS is mapped to the 57th to 183rd subcarriers in the third OFDM symbol. Zero may be set to the 1st to 56th subcarriers of the first OFDM symbol. Zero may be set to the 184th to 240th subcarriers of the first OFDM symbol. Zero may be set to the 49th to 56th subcarriers of the third OFDM symbol. Zero may be set to the 184th to 192nd subcarriers of the third OFDM symbol. The PBCH is mapped to subcarriers which are the 1st to 240th subcarriers of the second OFDM symbol and to which the DMRS for the PBCH is not mapped. The PBCH is mapped to subcarriers which are the 1st to 48th subcarriers of the third OFDM symbol and to which the DMRS for the PBCH is not mapped. The PBCH is mapped to subcarriers which are the 193rd to 240th subcarriers of the third OFDM symbol and to which the DMRS for the PBCH is not mapped. The PBCH is mapped to subcarriers which are the 1st to 240th subcarriers of the fourth OFDM symbol and to which the DMRS for the PBCH is not mapped.

The PSS, the SSS, the PBCH, and the antenna port of the DMRS for the PBCH may be the same.

The PBCH on which the symbol of the PBCH in a certain antenna port is delivered may be inferred by the DMRS for the PBCH mapped to the slot to which the PBCH is mapped and for the PBCH included in the SS/PBCH block including the PBCH.

The DL DMRS is a general term for a DMRS for the PBCH, a DMRS for the PDSCH, and a DMRS for the PDCCH.

A set of antenna ports of the DMRS for the PDSCH (DMRS related to the PDSCH, DMRS included in the PDSCH, DMRS corresponding to the PDSCH) may be given based on a set of antenna ports for the PDSCH. In other words, the set of antenna ports of the DMRS for the PDSCH may be the same as the set of antenna ports for the PDSCH.

Transmission of the PDSCH and transmission of the DMRS for the PDSCH may be indicated (or may be scheduled) by one DCI format. The PDSCH and the DMRS for the PDSCH may be collectively referred to as a PDSCH. Transmission of the PDSCH may be transmission of the PDSCH and the DMRS for the PDSCH.

The channel of the PDSCH may be inferred from the DMRS for the PDSCH. In a case that a set of resource elements in which the symbol of a certain PDSCH and a set of resource elements in which the symbol of the DMRS for the certain PDSCH is delivered are included in the same Precoding Resource Group (PRG), the PDSCH on which the symbol of the PDSCH in a certain antenna port is delivered may be inferred by the DMRS for the PDSCH.

The antenna port of the DMRS for the PDCCH (DMRS related to the PDCCH, DMRS included in the PDCCH, DMRS corresponding to the PDCCH) may be the same as the antenna port for the PDCCH.

The PDCCH may be inferred from the DMRS for the PDCCH. In other words, a channel of the PDCCH may be inferred from the DMRS for the PDCCH. In a case that the same precoder is applied (assumed to be applied) to a set of resource elements in which the symbol of a certain PDCCH is delivered and a set of resource elements in which the symbol of the DMRS for the certain PDCCH is delivered, the PDCCH on which the symbol of the PDCCH in a certain antenna port is delivered may be inferred by the DMRS for the PDCCH.

A Broadcast CHannel (BCH), an Uplink-Shared CHannel (UL-SCH), and a Downlink-Shared CHannel (DL-SCH) are transport channels. The transport channel defines a relationship between a physical layer channel and a MAC layer channel (also referred to as a logical channel).

The BCH in the transport layer is mapped to the PBCH in the physical layer. In other words, a transport block passing through the BCH in the transport layer is delivered to the PBCH in the physical layer. The UL-SCH in the transport layer is mapped to the PUSCH in the physical layer. In other words, a transport block passing through the UL-SCH in the transport layer is delivered to the PUSCH in the physical layer. The DL-SCH in the transport layer is mapped to the PDSCH in the physical layer. In other words, a transport block passing through the DL-SCH in the transport layer is delivered to the PDSCH in the physical layer.

For each serving cell, one UL-SCH and one DL-SCH may be given. The BCH may be given to the PCell. The BCH need not be given to the PSCell and the SCell.

In the MAC layer, the Hybrid Automatic Repeat reQuest (HARQ) is controlled for each transport block.

A Broadcast Control CHannel (BCCH), a Common Control CHannel (CCCH), and a Dedicated Control CHannel (DCCH) are logical channels. For example, the BCCH is a channel of the RRC layer used for transmitting the MIB or system information. A Common Control CHannel (CCCH) may be used for transmitting a common RRC message in multiple terminal apparatuses 1. Here, the CCCH may be, for example, used for the terminal apparatus 1 that is not in a state of RRC connection. A Dedicated Control CHannel (DCCH) may be at least used for transmitting a dedicated RRC message to the terminal apparatus 1. Here, the DCCH may be, for example, used for the terminal apparatus 1 that is in a state of RRC connection.

A higher layer parameter common to multiple terminal apparatuses 1 is also referred to as a common higher layer parameter. In this regard, the common higher layer parameter may be defined as a parameter specific to the serving cell. In this regard, the parameter specific to the serving cell may be a parameter common to terminal apparatuses configured with the serving cell (e.g., terminal apparatuses 1-A, 1-B, and 1-C).

For example, the common higher layer parameter may be included in the RRC message delivered to the BCCH. For example, the common higher layer parameter may be included in the RRC message delivered to the DCCH.

Among the higher layer parameters, higher layer parameters different from the common higher layer parameters are also referred to as dedicated higher layer parameters. In this regard, the dedicated higher layer parameter can provide a dedicated RRC parameter to the terminal apparatus 1-A configured with the serving cell. In other words, the dedicated RRC parameter is a higher layer parameter that can provide a specific configuration for each of the terminal apparatuses 1-A, 1-B, and 1-C.

The BCCH, which is a logical channel, may be mapped to the BCH or the DL-SCH in the transport layer. For example, a transport block including the information of a MIB is delivered to the BCH in the transport layer. A transport block including system information that is not a MIB is delivered to the DL-SCH in the transport layer. The CCCH is mapped to the DL-SCH or UL-SCH. In other words, the transport block mapped to the CCCH is delivered to the DL-SCH or the UL-SCH. The DCCH is mapped to the DL-SCH or UL-SCH. In other words, the transport block mapped to the DCCH is delivered to the DL-SCH or the UL-SCH.

The RRC message includes one or multiple parameters managed in the RRC layer. In this regard, the parameters managed in the RRC layer are also referred to as RRC parameters. For example, the RRC message may include the MIB. The RRC message may include the system information. The RRC message may include a message corresponding to the CCCH. The RRC message may include a message corresponding to the DCCH. The RRC message including a message corresponding to the DCCH is also referred to as a specific RRC message.

The higher layer parameter is an RRC parameter or a parameter included in the Medium Access Control Control Element (MAC CE). In other words, the higher layer parameter is a general term for the MIB, system information, a message corresponding to the CCCH, a message corresponding to the DCCH, and the parameter included in the MAC CE. The parameter included in the MAC CE is transmitted by a MAC Control Element (CE) command.

Procedures performed by the terminal apparatus 1 at least include a part or all of the following 5A to 5C.
5A) Cell search
5B) Random access
5C) Data communication The cell search is a procedure in which synchronization with a certain cell related to the time domain and the frequency domain is performed by the terminal apparatus 1, which is used for detecting a physical cell identity (physical cell ID). In other words, the terminal apparatus 1 may perform synchronization with a certain cell in the time domain and the frequency domain by means of cell search, and detect a physical cell ID.

A sequence of the PSS is given based at least on the physical cell ID. A sequence of the SSS is given based at least on the physical cell ID.

An SS/PBCH block candidate indicates a resource allowed to (capable of, scheduled to, configured to, defined to, having a possibility of) transmit the SS/PBCH block.

A set of SS/PBCH block candidates in a certain half radio frame is also referred to as an SS burst set. The SS burst set is also referred to as a transmission window, an SS transmission window, or a Discovery Reference Signal transmission window (DRS transmission window). The SS burst set is a general term at least including a first SS burst set and a second SS burst set.

The base station apparatus 3 transmits SS/PBCH blocks with one or multiple indexes in a prescribed periodicity. The terminal apparatus 1 may detect at least one SS/PBCH block out of the SS/PBCH blocks with one or multiple indexes, and attempt decoding of the PBCH included in the SS/PBCH block.

The random access is a procedure at least including a part or all of a message 1, a message 2, a message 3, and a message 4.

The message 1 is a procedure in which the PRACH is transmitted by the terminal apparatus 1. The terminal apparatus 1 transmits the PRACH in one PRACH occasion selected out of one or multiple PRACH occasions, based at least on the index of the SS/PBCH block candidate detected based on cell search. Each of the PRACH occasions is defined based at least on resources in the time domain and resources in the frequency domain.

The terminal apparatus 1 transmits one random access preamble selected out of the PRACH occasion corresponding to the index of the SS/PBCH block candidate in which the SS/PBCH block is detected.

The PDCCH including the DCI format to which the CRC scrambled with the RNTI is added is also referred to as PDCCH with RNTI, PDCCH for RNTI, or PDCCH addressed to RNTI.

A Cell Radio Network Temporary Identifier (C-RNTI) may be used for dynamically scheduled unicast transmission. The dynamically scheduled unicast transmission may correspond to the DL-SCH and the UL-SCH. In other words, the dynamically scheduled unicast transmission is either PDSCH transmission or PUSCH transmission. The terminal apparatus 1 may receive (decode) the PDSCH based on detection of the PDCCH addressed to the C-RNTI including a downlink assignment. The terminal apparatus 1 may transmit the PUSCH based on detection of the PDCCH addressed to the C-RNTI including uplink grant.

A configured scheduling Radio Network Temporary Identifier (CS-RNTI) may be used for a configured scheduled unicast transmission. The CS-RNTI may be used for activation and deactivation of the configured scheduled unicast transmission. The configured scheduled unicast transmission may correspond to the DL-SCH and the UL-SCH. In other words, the configured scheduled unicast transmission is either the PDSCH transmission or the PUSCH transmission.

The configured scheduled unicast transmission may include a downlink Semi-Persistent Scheduling (SPS) and an uplink configured grant.

The message 2 is a procedure in which detection of DCI format 1_0 with a Cyclic Redundancy Check (CRC) scrambled with a Random Access-Radio Network Temporary Identifier (RA-RNTI) by the terminal apparatus 1 is attempted. The terminal apparatus 1 attempts detection of the PDCCH including the DCI format in a control resource set given based on the MIB included in the PBCH included in the SS/PBCH block detected based on cell search, and resources indicated based on a configuration of a search space set. The message 2 is also referred to as a random access response.

The message 3 is a procedure in which the PUSCH scheduled using a random access response grant included in DCI format 1_0 detected through the procedure of the message 2 is transmitted. Here, the random access response grant is indicated by the MAC CE included in the PDSCH scheduled using DCI format 1_0.

The PUSCH scheduled based on the random access response grant is either of a message 3 PUSCH or a PUSCH. The message 3 PUSCH includes a contention resolution identifier (contention resolution ID) MAC CE. The contention resolution ID MAC CE includes a contention resolution ID.

Retransmission of the message 3 PUSCH is scheduled using DCI format 0_0 with a CRC scrambled based on a Temporary Cell-Radio Network Temporary Identifier (TC-RNTI).

The message 4 is a procedure in which detection of DCI format 1_0 with a CRC scrambled based on either of a Cell-Radio Network Temporary Identifier (C-RNTI) or a TC-RNTI is attempted. The terminal apparatus 1 receives the PDSCH scheduled based on DCI format 1_0. The PDSCH may include a contention resolution ID.

Data communication is a general term for downlink communication and uplink communication.

In data communication, the terminal apparatus 1 attempts detection of the PDCCH (monitors the PDCCH) in a control resource set and resources identified based on a search space set.

The control resource set is a set of resources including a certain number of resource blocks and a certain number of OFDM symbols. In the frequency domain, the control resource set may include continuous resources (non-interleaved mapping), or may include distributed resources (interleaver mapping).

A set of resource blocks constituting the control resource set may be indicated by a higher layer parameter. The number of OFDM symbols constituting the control resource set may be indicated by a higher layer parameter.

The terminal apparatus 1 attempts detection of the PDCCH in a search space set. Here, an attempt to detect the PDCCH in the search space set may be an attempt to detect a candidate of the PDCCH in the search space set, may be an attempt to detect a DCI format in the search space set, may be an attempt to detect the PDCCH in the control resource set, may be an attempt to detect a candidate of the PDCCH in the control resource set, or may be an attempt to detect a DCI format in the control resource set.

The search space set is defined as a set of candidates of the PDCCH. The search space set may be a Common Search Space (CSS) set, or may be a UE-specific Search Space (USS) set. The terminal apparatus 1 attempts detection of candidates of the PDCCH in a part or all of a Type 0 PDCCH common search space set, a Type 0a PDCCH common search space set, a Type 1 PDCCH common search space set, a Type 2 PDCCH common search space set, a Type 3 PDCCH common search space set, and/or a UE-specific PDCCH search space set (UE-specific search space set).

The Type 0 PDCCH common search space set may be used as a common search space set having an index of 0. The Type 0 PDCCH common search space set may be a common search space set having an index of 0.

The CSS set is a general term for the Type 0 PDCCH common search space set, the Type 0a PDCCH common search space set, the Type 1 PDCCH common search space set, the Type 2 PDCCH common search space set, and the Type 3 PDCCH common search space set. The USS set is also referred to as a UE-specific PDCCH search space set.

A certain search space set is related to (included in, corresponds to) a certain control resource set. The index of the control resource set related to the search space set may be indicated by a higher layer parameter.

For a certain search space set, some or all of 6A to 6C may be indicated by at least a higher layer parameter.
6A) Monitoring interval of the PDCCH (PDCCH monitoring periodicity)
6B) Monitoring pattern of the PDCCH in a slot (PDCCH monitoring pattern within a slot)
6C) Monitoring offset of the PDCCH (PDCCH monitoring offset)

The monitoring occasion of a certain search space set may correspond to the OFDM symbol to which the first OFDM symbol of the control resource set related to the certain search space set is mapped. The monitoring occasion of a certain search space set may correspond to a resource of the control resource set starting from the first OFDM symbol of the control resource set related to the certain search space set. The monitoring occasion of the search space set is given based at least on a part or all of the monitoring interval of the PDCCH, the monitoring pattern of the PDCCH in a slot, and the monitoring offset of the PDCCH.

Figure 8:
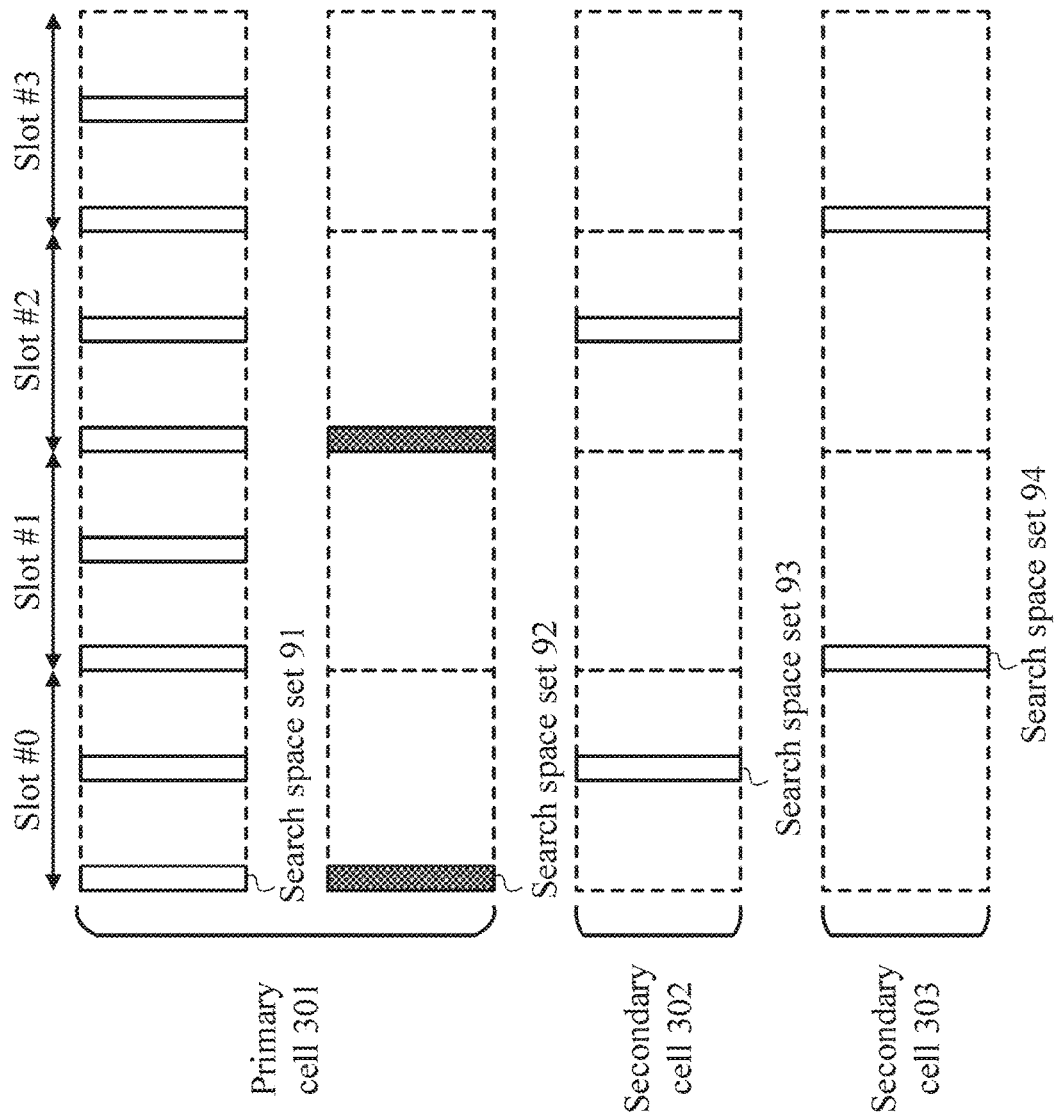
FIG. 8 is a diagram illustrating an example of monitoring occasions for search space sets according to an aspect of the present embodiment.

FIG. 8 is a diagram illustrating an example of monitoring occasions for the search space set according to an aspect of the present embodiment. In FIG. 8, search space sets 91 and search space sets 92 are configured in a primary cell 301, search space sets 93 are configured in a secondary cell 302, and search space sets 94 are configured in a secondary cell 303.

In FIG. 8, the solid white blocks in the primary cell 301 indicate the search space sets 91, the solid black blocks in the primary cell 301 indicate the search space sets 92, the blocks in the secondary cell 302 indicate the search space sets 93, and the blocks in the secondary cell 303 indicate the search space sets 94.

The monitoring periodicity of the search space set 91 is set to one slot, the monitoring offset of the search space set 91 is set to zero slots, and the monitoring pattern of the search space set 91 is set to [1, 0, 0, 0, 0, 0, 0, 1, 0, 0, 0, 0, 0, 0]. In other words, the monitoring occasion for the search space set 91 corresponds to the first OFDM symbol (OFDM symbol #0) and the eighth OFDM symbol (OFDM symbol #7) in each of the slots.

The monitoring periodicity of the search space set 92 is set to two slots, the monitoring offset of the search space set 92 is set to zero slots, and the monitoring pattern of the search space set 92 is set to [1, 0, 0, 0, 0, 0, 0, 0, 0, 0, 0, 0, 0, 0]. In other words, the monitoring occasion for the search space set 92 corresponds to the first OFDM symbol (OFDM symbol #0) in each of the even-numbered slots.

The monitoring periodicity of the search space set 93 is set to two slots, the monitoring offset of the search space set 93 is set to zero slots, and the monitoring pattern of the search space set 93 is set to [0, 0, 0, 0, 0, 0, 0, 1, 0, 0, 0, 0, 0, 0]. In other words, the monitoring occasion for the search space set 93 corresponds to the eighth OFDM symbol (OFDM symbol #7) in each of the even-numbered slots.

The monitoring periodicity of the search space set 94 is set to two slots, the monitoring offset of the search space set 94 is set to one slot, and the monitoring pattern of the search space set 94 is set to [1, 0, 0, 0, 0, 0, 0, 0, 0, 0, 0, 0, 0, 0]. In other words, the monitoring occasion for the search space set 94 corresponds to the first OFDM symbol (OFDM symbol #0) in each of the odd-numbered slots.

The Type 0 PDCCH common search space set may be at least used for the DCI format with a Cyclic Redundancy Check (CRC) sequence scrambled with a System Information-Radio Network Temporary Identifier (SI-RNTI).

The Type 0a PDCCH common search space set may be at least used for the DCI format with a Cyclic Redundancy Check (CRC) sequence scrambled with a System Information-Radio Network Temporary Identifier (SI-RNTI).

The Type 1 PDCCH common search space set may be at least used for the DCI format with a CRC sequence scrambled with a Random Access-Radio Network Temporary Identifier (RA-RNTI) and/or a CRC sequence scrambled with a Temporary Cell-Radio Network Temporary Identifier (TC-RNTI).

The Type 2 PDCCH common search space set may be used for the DCI format with a CRC sequence scrambled with a Paging-Radio Network Temporary Identifier (P-RNTI).

The Type 3 PDCCH common search space set may be used for the DCI format with a CRC sequence scrambled with a Cell-Radio Network Temporary Identifier (C-RNTI).

The UE-specific PDCCH search space set may be at least used for the DCI format with a CRC sequence scrambled with a C-RNTI.

In downlink communication, the terminal apparatus 1 detects a downlink DCI format. The detected downlink DCI format is at least used for resource allocation of the PDSCH. The detected downlink DCI format is also referred to as downlink allocation (downlink assignment). The terminal apparatus 1 attempts reception of the PDSCH. Based on the PUCCH resource indicated based on the detected downlink DCI format, the HARQ-ACK corresponding to the PDSCH (HARQ-ACK corresponding to the transport block included in the PDSCH) is reported to the base station apparatus 3.

In uplink communication, the terminal apparatus 1 detects an uplink DCI format. The detected DCI format is at least used for resource allocation of the PUSCH. The detected uplink DCI format is also referred to as an uplink grant. The terminal apparatus 1 performs transmission of the PUSCH.

In the configured scheduling (configured grant), the uplink grant scheduling the PUSCH is configured for each transmission periodicity of the PUSCH. In a case that the PUSCH is scheduled by the uplink DCI format, a part or all of the information indicated by the uplink DCI format may be indicated by an uplink grant configured in a case of configured scheduling.

Repetition transmission may be applied to the PUSCH scheduled by the DCI. The repetition transmission may be applied to the PUSCH scheduled by the configured uplink grant. A PUSCH repetition type may be either of a PUSCH repetition type A or a PUSCH repetition type B. The PUSCH repetition type may be configured by a higher layer parameter. The PUSCH repetition type may be based on the DCI format. For example, a first PUSCH repetition type for the PUSCH scheduled by DCI format 0_1 may be different from a second PUSCH repetition type for the PUSCH scheduled by DCI format 0_2.

The number of repetitions for the PUSCH repetition transmission may be configured by a higher layer parameter. For example, the higher layer parameter numberOfRepetitions may be a parameter including the number of repetitions for the PUSCH repetition transmission. In the PUSCH repetition transmission corresponding to the PUSCH repetition type A, the number of repetitions for the PUSCH repetition transmission may be determined by the value of the higher layer parameter numberOfRepetitions. For the PUSCH repetition type A, for the PUSCH for which transmission is indicated by the DCI format with the CRC scrambled with one of the C-RNTI, an MCS-C-RNTI, or a CS-RNTI, in a case that the resource allocation table includes numberOfRepetitions, the number of repetitions may be equal to numberOfRepetitions. In a case that one PUSCH-TimeDomainResourceAllocation includes one or multiple PUSCH-Allocations, the higher layer parameter numberOfRepetitions may be configured for each PUSCH-Allocation. PUSCH-TimeDomainResourceAllocation may also be referred to as a resource allocation table.

A higher layer parameter pusch-AggregationFactor may be a parameter indicating the number of repetitions for the PUSCH repetition transmission. For the PUSCH repetition transmission corresponding to the PUSCH repetition type A, the number of repetitions for the PUSCH repetition transmission may be determined by the value of the higher layer parameter pusch-AggregationFactor. For the PUSCH repetition type A, for the PUSCH for which transmission is indicated by the DCI format with the CRC scrambled with one of the C-RNTI, the MCS-C-RNTI, or the CS-RNTI, in a case that pusch-AggregationFactor is configured, the number of repetitions may be equal to pusch-AggregationFactor. pusch-AggregationFactor may be configured for PUSCH-Config.

A UL slot may be a slot configured with UL symbols. A special slot may be a slot including UL symbols, flexible symbols, and DL symbols. A DL slot may be a slot configured with DL symbols.

The UL symbol may be an OFDM symbol configured or indicated for the uplink in time division duplex. The UL symbol may be an OFDM symbol configured or indicated for the PUSCH, or the PUCCH, the PRACH, or the SRS. The UL symbol may be provided at least by a higher layer parameter tdd-UL-DL-ConfigurationCommon. The UL symbol may be provided by a higher layer parameter tdd-UL-DL-ConfigurationDedicated. The UL slot may be provided by a higher layer parameter tdd-UL-DL-ConfigurationCommon. The UL slot may be provided by a higher layer parameter tdd-UL-DL-ConfigurationDedicated.

The DL symbol may be an OFDM symbol configured or indicated for the downlink in time division duplex. The DL symbol may be an OFDM symbol configured or indicated for the PDSCH or the PDCCH. The DL symbol may be provided by the higher layer parameter tdd-UL-DL-ConfigurationCommon. The DL symbol may be provided by the higher layer parameter tdd-UL-DL-ConfigurationDedicated. The DL slot may be provided by the higher layer parameter tdd-UL-DL-ConfigurationCommon. The DL slot may be provided by the higher layer parameter tdd-UL-DL-ConfigurationDedicated.

Flexible symbols may be those of the OFDM symbols within a certain periodicity which are not configured or indicated as UL symbols or DL symbols. The certain periodicity may be a periodicity given by a higher layer parameter dl-UL-TransmissionPeriodicity. The flexible symbol may be an OFDM symbol configured or indicated for the PDSCH, PDCCH, PUSCH, PUCCH, or PRACH.

The higher layer parameter tdd-UL-DL-ConfigurationCommon may be a parameter configuring one of a UL slot, a DL slot, or a special slot for each of one or multiple slots. The higher layer parameter tdd-UL-DL-ConfigurationDedicated may be a parameter configuring one of a UL symbol, a DL symbol, or a flexible symbol for a flexible symbol in each of the one or more slots. The tdd-UL-DL-ConfigurationCommon may be a common higher layer parameter. The tdd-UL-DL-ConfigurationDedicated may be a dedicated higher layer parameter.

A MAC entity may include one HARQ entity in each serving cell. Each HARQ entity may manage one or multiple HARQ processes. Each HARQ process may be associated with a HARQ process identifier (ID). The HARQ entity may direct the HARQ information and the TB received on the DL-SCH to a corresponding HARQ process. The corresponding HARQ process may be a HARQ process corresponding to the HARQ process ID included in the HARQ information.

The number of HARQ processes may be provided for each HARQ entity. For example, the HARQ processes may be parallel to one another. Dedicated broadcast HARQ processes may be used for the BCCH.

The HARQ process may support one TB. For example, the HARQ process may be used for one TB. For example, the HARQ process may correspond to one TB. In a case that the physical layer is not configured for downlink spatial multiplexing, the HARQ process may support one TB. The HARQ process may support one or two TBs. For example, the HARQ process may correspond to one or two TBs. In a case that the physical layer is configured for downlink spatial multiplexing, the HARQ process may support one or two TBs.

The higher layer parameter may provide the number of TB transmissions. For example, the higher layer parameter may provide the number of TB transmissions in a bundle of downlink assignments. A bundling operation may depend on the HARQ entity. The same HARQ process may be invoked for each transmission corresponding to a part of the same bundle. The bundling operation may depend on the HARQ entity to invoke the same HARQ process for each transmission corresponding to a part of the same bundle. A certain number of HARQ retransmissions may be performed after an initial transmission. The certain number may be the value of the higher layer parameter pdsch-AggregationFactor minus one.

The MAC entity may allocate TBs and HARQ information to the HARQ processes. For example, in a case that the downlink assignment is indicated, the MAC entity may allocate TBs and HARQ information to the HARQ processes. The HARQ process may be indicated by the HARQ information. The HARQ information may be associated with the TB. For example, the HARQ information may indicate the TBS of the TB. The TB may be received from the physical layer. For example, in a case that the downlink assignment is indicated for a broadcast HARQ process, the MAC entity may allocate the received TB to the broadcast HARQ process.

The HARQ information may be HARQ information for one of the DL-SCH, the UL-SCH, or the SL-SCH. The HARQ information may include some or all of a New Data Indicator (NDI), a Transport Block Size (TBS), a Redundancy Version (RV), and a HARQ process ID.

A certain transmission may be performed that corresponds to the HARQ process. For example, in a case that a certain transmission is performed in the HARQ process, one or two TBs and the HARQ information may be received from the HARQ entity. The HARQ process may assume that the certain transmission is a new transmission. For example, in a case that the NDI is toggled, the HARQ process may assume that the certain transmission is a new transmission. For example, in a case that the NDI is toggled for each certain TB compared to the value of the NDI for a transmission previously received and corresponding to the certain TB, the certain transmission may be assumed to be a new transmission. For example, in a case that the HARQ process is at least equal to a broadcast process, the HARQ process may assume that the certain transmission is a new transmission. For example, in a case that the previous NDI for the certain TB is absent, the HARQ process corresponding to the certain TB may assume that the certain transmission is a new transmission. The new transmission may be the initial transmission. In a case that the certain transmission is not a new transmission, the certain transmission may be a retransmission. For example, in a case that the NDI is not toggled, the certain transmission may be a retransmission.

In a case that the certain transmission is a new transmission, the MAC entity may attempt to decode received data. In a case that the certain transmission is a retransmission, the MAC entity may indicate to the physical layer synthesis of the received data and data in a soft buffer. The MAC entity may attempt to decode synthesized data. The data may correspond to the TB. The soft buffer may correspond to the TB. The HARQ process may be equal to a broadcast process. In a case that decoding of certain data succeeds, the MAC entity may transmit decoded data (e.g., MAC PDU) to the higher layer. In a case that decoding of the certain data fails, the MAC entity may indicate, to the physical layer, placement of the certain data in the soft buffer. The MAC entity may indicate, to the physical layer, generation of Acknowledgement(s)(ACK) of the data. The MAC entity may disregard the NDI. For example, the NDI may be received in all downlink assignments. The downlink assignment may be present in the PDCCH. The PDCCH may be associated with a Temporary C-RNTI (TC-RNTI). For example, in a case that whether the NDI in the PDCCH corresponding to the C-RNTI is toggled is determined, the MAC entity may disregard the NDI in the PDCCH corresponding to the TC-RNTI. Toggling the NDI may mean that the NDI is toggled compared to the value of the NDI for the previous transmission.

The SPS may be configured (or provided) by a higher layer parameter. The SPS may be configured by the RRC layer for each BWP in one serving cell. For example, the SPS may be provided by the RRC layer for each BWP in one serving cell. In one BWP, multiple configured downlink assignments may be activated. Activation and deactivation of the SPS may be independent between multiple serving cells. For example, in a case that first SPS in a first serving cell is activated, second SPS in a second serving cell may be activated or deactivated.

Activation of the SPS may mean activation of the configured downlink assignment. Activation of the SPS may mean that the configured downlink assignment is activated. Activation of the SPS may mean that activation of the SPS is indicated. Activation of the SPS may mean that the configured downlink assignment is initiated (or resumed or stored). Activation of the SPS may mean that validation of the activation PDCCH is achieved. Activation of the SPS may mean that a special field in the DCI format has a specific value and that validation of the DCI format is achieved. Activation of the SPS may mean that the SPS PDSCH is activated. Activation of the SPS may mean that the PDSCH is activated.

Deactivation of the SPS may mean deactivation of the configured downlink assignment. Deactivation of the SPS may mean that the configured downlink assignment is deactivated. Deactivation of the SPS may mean that deactivation of the SPS is indicated. Deactivation of the SPS may mean that the configured downlink assignment is cleared or released. Deactivation of the SPS may mean that validation of deactivation PDCCH is achieved. Deactivation of the SPS may mean that a special field in the DCI format has a specific value and that validation of the DCI format is achieved. Deactivation of the SPS may mean that the SPS PDSCH is deactivated. Deactivation of the SPS may mean that the PDSCH is deactivated.

The configured downlink assignment may be a downlink SPS assignment. The configured downlink assignment may be a downlink assignment for the SPS PDSCH.

The SPS PDSCH may be a PDSCH with no corresponding PDCCH. The SPS PDSCH may be a PDSCH with no corresponding PDCCH transmission. The SPS PDSCH may be an activated PDSCH. The PDSCH may be received with no corresponding PDCCH transmission. The SPS PDSCH may be a PDSCH scheduled by the configured downlink assignment. The SPS PDSCH may be a PDSCH for which transmission is indicated by the configured downlink assignment. The SPS PDSCH may be a PDSCH using a higher layer parameter sps-Config. The SPS PDSCH may be a PDSCH activated by DCI format 1_1 or DCI format 1_2. The SPS PDSCH may be a PDSCH scheduled using sps-Config with no corresponding PDCCH transmission. The SPS PDSCH may be a PDSCH activated by DCI format 4-2. The SPS PDSCH may be PDSCH with SPS.

The SPS PDSCH configuration may be a higher layer parameter SPS-Config. The SPS PDSCH configuration may be a configuration for the SPS.

The periodicity for the SPS PDSCH may be a periodicity in the SPS PDSCH configuration. The periodicity for the SPS PDSCH may be a periodicity of the configured downlink assignment. The periodicity for the SPS PDSCH may be a periodicity for the SPS. The periodicity for the SPS PDSCH may be a higher layer parameter periodicity, or the value of the higher layer parameter periodicity. The periodicity for the SPS PDSCH may be a value provided in the DCI format.

In the SPS, one downlink assignment may be provided by the PDCCH. One downlink assignment may be stored based on signaling of the physical layer indicating activation. One downlink assignment may be cleared based on signaling of the physical layer indicating deactivation.

For the SPS, one or multiple higher layer parameters may be configured. For example, one or multiple higher layer parameters may include some or all of the higher layer parameters described below. One SPS configuration may include some or all of the higher layer parameters described below. The SPS PDSCH configuration may include some or all of the higher layer parameters described below.

cs-RNTI
nrofHARQ-processes
harq-ProcID-Offset
periodicity

A higher layer parameter cs-RNTI may be the value of the RNTI for the configured scheduling in the downlink and/or in the uplink. The cs-RNTI may be used for one of activation, deactivation, or retransmission.

The number of HARQ processes for the SPS may be provided by a higher layer parameter. For example, a higher layer parameter nrofHARQ-processes may provide the number of HARQ processes configured for the SPS. The HARQ process may be managed by the HARQ entity. The terminal apparatus 1 may allocate, to the HARQ process indicated by the HARQ information, the transport block and HARQ information received from the physical layer.

An offset may be provided by a higher layer parameter for the HARQ process ID. For example, an offset used in derivation of the HARQ process ID may be provided by a higher layer parameter. The offset of the HARQ process for the SPS may be determined by a higher layer parameter. The higher layer parameter may be harq-ProcID-Offset.

The periodicity of the configured downlink assignment for the SPS may be configured by a higher layer parameter. The periodicity for the SPS may be configured by a higher layer parameter. The periodicity for the SPS PDSCH may be configured by a higher layer parameter. The periodicity of the configured downlink assignment may be configured by a higher layer parameter. The configuration by a higher layer parameter may be provision by the higher layer parameter. The configuration by a higher layer parameter may be determination based on the higher layer parameter. The periodicity may be based on the subcarrier spacing. The periodicity may be provided by using unit milliseconds. The periodicity may be provided by using a frame rate (Frame per second (FPS)). The periodicity may be provided by using the reciprocal of the frame rate. The periodicity may be an integer. The periodicity may be a real number. The periodicity may be 10 milliseconds or less. The periodicity may be updated by the DCI format. The periodicity may be indicated by the DCI format. The higher layer parameter may be the higher layer parameter periodicity.

The configuration for the SPS (or a PDSCH SPS configuration) may be indexed. One or multiple SPS configurations may be provided. The indexes of the one or multiple SPS configurations may be configured by a higher layer parameter. The higher layer parameter may be sps-ConfigIndex. The higher layer parameter may be referred to as an SPS PDSCH configuration index.

After the downlink assignment for the SPS is configured, a first downlink assignment may occur in the first slot. The first slot may be determined based on one or multiple elements. The one or multiple elements may include the number of slots in one radio frame ($N^{frame, \mu}_{slot}$). The one or more elements may include a system frame number. The one or multiple elements may include a slot number (slot index) in one radio frame. The one or multiple elements may include a periodicity for SPS. The one or multiple elements may include the higher layer parameter periodicity. A second downlink assignment may occur in a second slot. The second slot may be a slot periodicity$\times N^{frame, \mu}_{slot}/10$ after the first slot. The PDSCH transmitted by the second downlink assignment may be a retransmission of the PDSCH transmitted by the first downlink assignment.

The downlink assignment may be provided by the PDCCH. The downlink assignment may be received on the PDCCH. The downlink assignment may indicate that the DL-SCH is transmitted in one MAC entity. The downlink assignment may indicate that transmission is to occur in the DL-SCL in the MAC entity. The downlink assignment may provide HARQ information.

The MAC entity may include one of the C-RNTI, the Temporary C-RNTI, or the CS-RNTI. The MAC entity may determine whether, on each PDCCH occasion, the NDI is considered to have been toggled. A certain downlink assignment may be received on the PDCCH. The PDCCH may be a PDCCH for the C-RNTI of the MAC entity or for the Temporary C-RNTI. A certain downlink assignment may be a downlink assignment corresponding to one PDCCH occasion and one serving cell. In a case that a certain downlink assignment is the first downlink assignment for the Temporary C-RNTI, the MAC entity may consider that the NDI has been toggled. In a case that some or all of condition 1, condition 2, and condition 3 are satisfied, the MAC entity may consider that the NDI has been toggled. In a case that some or all of condition 1, condition 2, and condition 3 are satisfied, the MAC entity need not take into account the value of the NDI. Condition 1 may be that a certain downlink assignment corresponds to the C-RNTI of the MAC entity. Condition 2 may be that the previous downlink assignment is a downlink assignment received for the MAC entity with the CS-RNTI. Condition 3 may be that the previous downlink assignment is the configured downlink assignment. The previous downlink assignment may be indicated to the HARQ entity in the same HARQ process. The MAC entity may indicate the presence of the downlink assignment to the HARQ entity. The MAC entity may deliver HARQ information to the HARQ entity.

The PDCCH may be a PDCCH for the CS-RNTI of the MAC entity. In a case that the NDI in the received HARQ information is 1, the MAC entity may consider that the NDI of a certain HARQ process has not been toggled. Furthermore, the presence of a certain downlink assignment and the HARQ information may be indicated to the HARQ entity. In a case that the NDI in the received HARQ information is 0, whether the PDCCH (or PDCCH contents) indicates SPS activation or SPS deactivation may be determined. In a case that the PDCCH indicates SPS activation, the MAC entity may store a certain downlink assignment and the HARQ information as the configured downlink assignment. Furthermore, the MAC entity may initiate (or resume) the configured downlink assignment.

In a case that the PDCCH indicates SPS deactivation, the MAC entity may clear the configured downlink assignment. In addition, in a case that timeAlignmentTimer is running, then positive acknowledgement for SPS deactivation may be indicated to the physical layer. timeAlignmentTimer may control the duration for which the MAC entity takes into account one or multiple serving cells. The one or multiple serving cells may belong to an associated TAG. In the one or multiple serving cells, a HARQ feedback may be transmitted.

The MAC entity may perform the processing described below in a certain serving cell and in a certain configured downlink assignment. For example, in a case that the first PDSCH duration of the certain configured downlink assignment does not overlap with the second PDSCH duration of the downlink assignment received on the PDCCH, the MAC entity may indicate, to the physical layer, reception of the transport block (TB) on the DL-SCH according to the certain configured downlink assignment, in the first PDSCH duration. Furthermore, the MAC entity may transmit the transport block to the HARQ entity. Furthermore, the MAC entity may set the HARQ process ID to an HARQ process ID associated with the first PDSCH duration. Furthermore, the MAC entity may consider that the NDI bits corresponding to the HARQ process have been toggled. In addition, the MAC entity may indicate the presence of the configured downlink assignment to the HARQ entity, and may deliver the stored HARQ information to the HARQ entity. The configured downlink assignment may be activated. The fact that the NDI bits are considered to have been toggled may be that the NDI is considered to have been toggled.

The HARQ process ID for the configured downlink assignment may be determined based on Equation 1. The HARQ process ID for the SPS may be determined based on Equation 1. P1 may be the number of slots in one radio frame ($N^{frame, \mu}_{slot}$). P2 may be configured by a higher layer parameter. For example, P2 may be configured by the higher layer parameter periodicity. P3 may be configured by a higher layer parameter. For example, P3 may be configured by a higher layer parameter nrofHARQ-Processes. CURRENT_slot may correspond to the slot in which DL transmission is initiated. For example, CURRENT_slot may be determined based on an SFN, $N^{frame, \mu}_{slot}$, and the slot index.

$$\text{HARQ Process ID} = [\text{floor}(\text{CURRENT\_slot} \times 10/(P1 \times P2))] \text{ modulo } P3 \qquad [\text{Equation 1}]$$

The HARQ process ID for the configured downlink assignment may be determined based on Equation 2. The HARQ process ID for the SPS may be determined based on Equation 2. P1, P2, and P3 in Equation 2 may respectively be the same as P1, P2, and P3 in Equation 1. P4 may be configured by a higher layer parameter. For example, P4 may be a higher layer parameter harq-ProcId-Offset.

$$\text{HARQ Process ID} = [\text{floor}(\text{CURRENT\_slot} \times 10/(P1 \times P2))] \text{ modulo } P3 + P4 \qquad [\text{Equation 2}]$$

Figure 9:
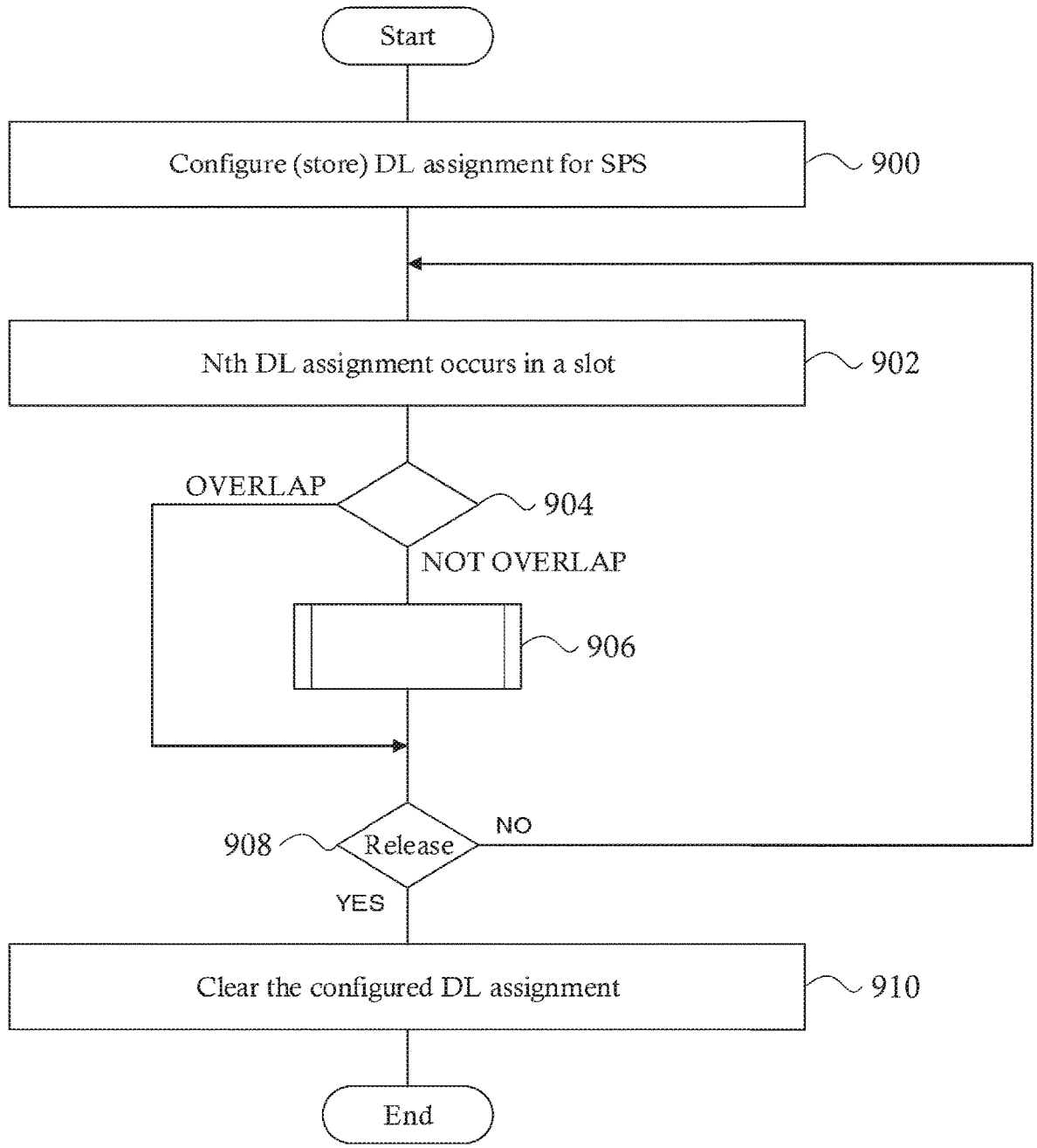
FIG. 9 is a diagram illustrating a flow for describing an example of SPS according to an aspect of the present embodiment.

The SPS according to the present embodiment will be described below. FIG. 9 is a diagram illustrating a flow for describing an example of the SPS according to the present embodiment. The processing in FIG. 9 may be performed by the radio resource control layer processing unit 16 or the MAC entity (MAC layer) of the terminal apparatus 1.

At 900, the terminal apparatus 1 receives the downlink assignment for the SPS, configures or stores the downlink assignment for the SPS, and proceeds to 902. The configured or stored downlink assignment is also referred to as the configured downlink assignment. The terminal apparatus 1 may receive the downlink assignment for the SPS by using the PDCCH addressed to the CS-RNTI.

After the downlink assignment is configured for the SPS, in 902, the terminal apparatus 1 sequentially considers that the Nth downlink assignment occurs in a downlink slot satisfying Equation 3 below, and proceeds to 904.

$$(N^{frame, \mu}_{slot} \times N_{SFN} + N_{slot}) = [(N^{frame, \mu}_{slot} \times N_{SFN\_start} \\ \_SPS + N_{slot\_start\_SPS}) + N \times N_{periodicity\_SPS} \times N^{frame, \mu}_{slot}/10] \text{ modulo } (1024 \times N^{frame, \mu}_{slot}) \qquad [\text{Equation 3}]$$

$N_{SFN}$ is a System Frame Number (SFN) corresponding to a radio frame number. $N_{slot}$ represents the number of a slot in the radio frame. $N_{SFN\_start\_SPS}$ and $N_{slot\_start\_SPS}$ are the SFN and slot of the first transmission of the PDSCH in which the configured downlink assignment is initiated. $N_{periodicity\_SPS}$ is a parameter configured by the RRC, and is the periodicity of the configured downlink assignment for the SPS. The configured downlink assignment may be implicitly reused according to the periodicity defined by the RRC.

At 904, the terminal apparatus 1 determines whether the duration of the PDSCH of the configured downlink assignment overlaps with the duration of the PDSCH of the downlink assignment received on the PDCCH. At 904, in a case that the terminal apparatus 1 determines that the duration of the PDSCH of the configured downlink assignment does not overlap with the duration of the PDSCH of the downlink assignment received on the PDCCH, the terminal apparatus 1 proceeds to 906. At 904, in a case that the terminal apparatus 1 determines that the duration of the PDSCH of the configured downlink assignment overlaps with the duration of the PDSCH of the downlink assignment received on the PDCCH, the terminal apparatus 1 proceeds to 908.

At 906, the terminal apparatus 1 attempts to decode the transport block received in the duration of the PDSCH of the configured downlink assignment. In other words, at 904, in a case that the terminal apparatus 1 determines that the duration of the PDSCH in the configured downlink assignment overlaps with the duration of the PDSCH in the downlink assignment received on the PDCCH, the terminal apparatus 1 need not attempt to decode the transport block in the PDSCH corresponding to the configured downlink assignment. In other words, in a case that the terminal apparatus 1 fails to find the PDCCH addressed to the C-RNTI, a downlink transmission according to the configured downlink assignment is assumed. In a case that the terminal apparatus 1 finds the PDCCH addressed to the C-RNTI (downlink assignment), the downlink assignment configured with the allocation of the PDCCH addressed to the C-RNTI (downlink assignment) is overridden.

FIG. 10 is a diagram illustrating a detailed example of 906 in the present embodiment. 906 may include some or all of 906a to 906g. The terminal apparatus 1 may sequentially perform the processing starting with 906a. At 906a, the terminal apparatus 1 may indicate, to the physical layer, reception of the transport block on the DL-SCH according to the configured downlink assignment, in the duration of the PDSCH of the configured downlink assignment, and pass the transport block to the HARQ entity. At 906b, the terminal apparatus 1 may set the HARQ process ID to the HARQ process ID associated with the duration of the PDSCH. The HARQ process ID associated with the duration of the PDSCH may be given based at least on the number of the slot including the duration of the PDSCH. At 906c, the terminal apparatus 1 considers that the NDI bits have been toggled. At 906d, the terminal apparatus 1 indicates, to the HARQ entity, the presence of the configured downlink assignment, and passes the HARQ information to the HARQ entity.

906e may be processed by the HARQ entity provided in the MAC entity of the terminal apparatus 1. The HARQ entity manages HARQ processes. At 906e, the terminal apparatus 1 may allocate the transport block received from the physical layer and the HARQ information to the HARQ process indicated by the HARQ information.

906f and 906g may be processed by the HARQ process of the terminal apparatus 1. At 906f, the terminal apparatus 1 attempts to decode the transport block received. At 906g, the terminal apparatus 1 indicates, to the physical layer, generation of HARQ-ACK of the data in the transport block.

At 908, the terminal apparatus 1 determines whether deactivation (release) of the SPS is indicated. At 908, in a case that the terminal apparatus 1 determines that deactivation (release) of the SPS is indicated, the terminal apparatus 1 proceeds to 910 and clears the configured downlink assignment. At 908, in a case that the terminal apparatus 1 determines that deactivation (release) of the SPS is not indicated, the terminal apparatus 1 proceeds to 902.

In each serving cell, one or multiple PDSCHs may be transmitted with no corresponding PDCCH transmission. In a case that one slot contains first one or the multiple PDSCHs with no corresponding PDCCHs, the terminal apparatus 1 may receive second one or multiple PDSCHs based on some or all of order 0, order 1, order 2, and order 3. The second one or multiple PDSCHs may be some or all of the first one or the multiple PDSCHs. The second one or multiple PDSCHs may be one or multiple PDSCHs resulting from resolution of overlapping with OFDM symbols in the slot indicated as UL (UL slot). Order 0 may mean that j is set to 0. j may be the number of PDSCHs selected for decoding. Q may be a set of activated PDSCHs. The activated PDSCHs may be PDSCHs with no corresponding PDCCH transmission, the PDSCHs being included within one slot. Order 1 may mean that the terminal apparatus 1 receives one PDSCH. One PDSCH may have the lowest index of one or multiple indexes in a set Q. The one or multiple indexes may be indexes configured by a higher layer parameter. The one or multiple indexes may be indexes configured by a higher layer parameter sps-ConfigIndex. Order 1 may mean that j is set to j+1. Order 1 may mean that one PDSCH received is designated as a survivor PDSCH. Order 2 may mean that the survivor PDSCH in order 1 and the PDSCH overlapping with the survivor PDSCH in order 1 are excluded from the set Q. Order 3 may mean that order 1 and order 2 are repeated until the set Q is empty. Order 3 may mean that order 1 and order 2 are repeated until j is equal to a first number. The first number may be the number of PDSCHs (or unicast/multicast PDSCHs) in one slot.

The terminal apparatus 1 may validate the PDCCH for the SPS. Validating the PDCCH may be to validate the DCI format. For example, the terminal apparatus 1 may validate the PDCCH to schedule activation or deactivation (release). For example, the terminal apparatus 1 may validate the PDCCH to simultaneously schedule activation and deactivation. The PDCCH may be a downlink SPS assignment PDCCH. In a case that the CRC in the DCI format is scrambled with the CS-RNTI, the terminal apparatus 1 may validate the PDCCH. The DCI format may be mapped to the PDCCH. In a case that the New data indicator (NDI) field in the DCI format is set to 0, the terminal apparatus 1 may validate the PDCCH. In a case that the DFI flag field in the DCI format is set to 0, the terminal apparatus 1 may validate the PDCCH. In a case that the validation is intended to schedule activation and that the DCI format contains a PDSCH_HARQ feedback timing indication field, the PDSCH_HARQ feedback timing indication field need not provide an inapplicable value from the higher layer parameter dl-DataToUl-Ack-r16.

In a case that one configuration (e.g., SPS-Config) is provided for the SPS PDSCH and that one or multiple fields in the DCI format are set to particular values, validation of the DCI format may be achieved. The one or multiple fields may be some or all of the HARQ process number field, the RV field, the MCS field, and the frequency domain resource allocation field. The one or multiple fields may be referred to as special fields. For example, in a case that the values in the HARQ process number field are all 0 and that the values in the RV field are all 0, validation of the activation PDCCH may be achieved. Achievement of validation of the activation PDCCH may mean that the PDCCH indicates SPS activation. For example, in a case that the values in the HARQ process number field are all 0 and that the values in the RV field are all 0 and that the values in the MCS field are all 1 and that the values in the frequency allocation field are all 0 or all 1, validation of the deactivation (release) PDCCH may be achieved. Achievement of validation of the deactivation PDCCH may mean that the PDCCH indicates SPS deactivation. Achievement of validation of the PDCCH may mean that validation of the DCI format is achieved.

In a case that multiple configurations (e.g., multiple SPS-Configs) are provided for the SPS PDSCH, the value in the HARQ process number field may indicate activation for configuration of the SPS PDSCH with the same first value (or index). The first same value may be given by a higher layer parameter. For example, the higher layer parameter may be sps-ConfigIndex. In other words, for one or multiple configurations for the SPS PDSCH, validation of the PDCCH (or the DCI format) may be performed. The one or multiple configurations may have the first same value. In a case that one or multiple fields in the DCI format are set to specific values, validation of the DCI format may be achieved. The one or multiple fields may be some or all of the RV field, the MCS field, and the frequency domain resource allocation field. The one or multiple fields may be referred to as special fields. For example, in a case that the values in the RV field are all 0, validation of the activation PDCCH may be achieved. For example, in a case that the values in the RV field are all 0 and that the values in the MCS field are all 1 and that the values in the frequency domain resource allocation field are all 0 or all 1, validation of the deactivation (release) PDCCH may be achieved. Achievement of validation of the PDCCH may mean that validation of the DCI format is achieved.

For example, in a case that the first HARQ process ID is indicated by the HARQ process number field, validation of the DCI format may be achieved for the first SPS PDSCH configuration (or the SPS PDSCH, the configured downlink assignment) corresponding to the first HARQ process ID, and the second SPS PDSCH configuration (or the SPS PDSCH, the configured downlink assignment) corresponding to the first HARQ process ID. The HARQ process number field may be used to determine the HARQ process ID. The HARQ process ID for the SPS PDSCH may be the HARQ process ID for the configured downlink assignment. The HARQ process ID corresponding to the SPS PDSCH may mean that the HARQ process ID corresponds to the SPS PDSCH configuration. The HARQ process ID corresponding to the SPS PDSCH may mean that the HARQ process ID corresponds to the configured downlink assignment.

In a case that multiple SPS PDSCH configurations (e.g., multiple SPS-Configs) are provided and that a higher layer parameter sps-ConfigDeactivationStateList is provided, the value of the HARQ process number field may indicate corresponding entries in order to schedule deactivation of first one or multiple SPS PDSCH configurations. In other words, the corresponding entries may identify the first one or multiple SPS PDSCHs from the multiple SPS PDSCH configurations. In a case that multiple SPS PDSCH configurations are provided and that the higher layer parameter sps-ConfigDeactivationStateList is not provided, the value of the HARQ process number field may indicate deactivation for the SPS PDSCH configuration with a value provided by sps-ConfigIndex. In a case that the values in the RV field are all 0 and that the values in the MCS field are all 1 and that the values in the frequency domain resource allocation field are all 0 or all 1, validation of the DCI format (or the deactivation PDCCH) may be achieved.

Achievement of either the validation of the activation PDCCH or the validation of the deactivation PDCCH may mean that validation of the PDCCH (or validation of the DCI format) is achieved. In a case that the validation is achieved, the information in the DCI format may be considered as a valid activation of the SPS or valid release of the SPS. In a case that the validation is not achieved, the terminal apparatus 1 may clear all of the information in the DCI format.

As a problem to be solved, the parameters in the SPS PDSCH configuration (e.g., the periodicity for the SPS) need to be dynamically changed according to traffic or jitter for efficient communication. For example, means 1 and means 2 may be used to solve the problem.

Figure 11:
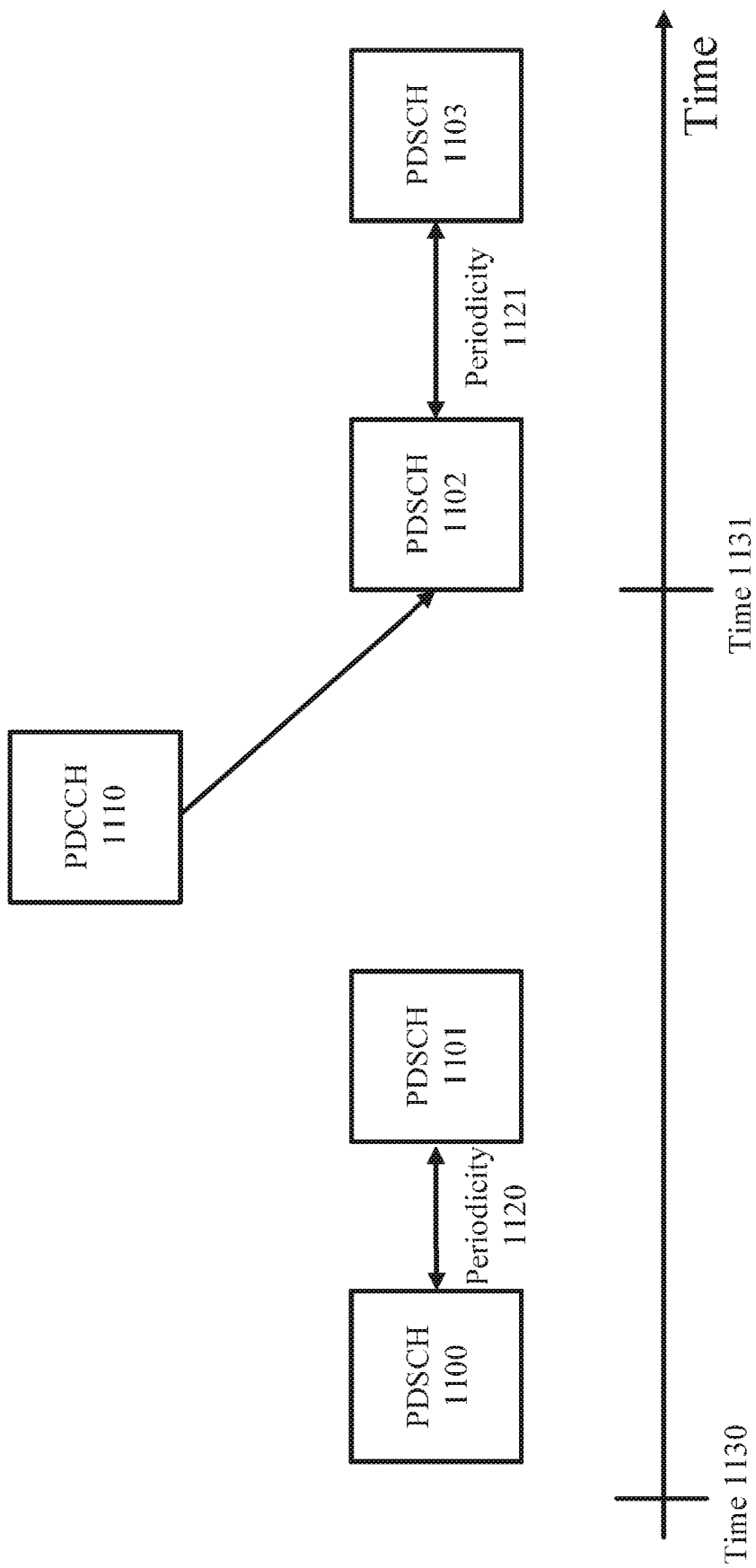
FIG. 11 is a diagram illustrating an example of SPS PDSCH reception in different periodicities based on a PDCCH according to an aspect of the present embodiment.

FIG. 11 is a diagram illustrating an example of SPS PDSCH receptions in different periodicities based on the PDCCH according to an aspect of the present embodiment. In FIG. 11, a PDSCH 1100 may be received, a PDSCH 1101 may be received, a PDSCH 1102 may be received, and a PDSCH 1103 may be received. A PDCCH 1110 may be received. The PDSCH 1100, the PDSCH 1101, the PDSCH 1102, and the PDSCH 1103 may be SPS PDSCHs. In other words, the PDSCH 1100 may be the SPS PDSCH 1100, the PDSCH 1101 may be the SPS PDSCH 1101, the PDSCH 1102 may be the SPS PDSCH 1102, and the PDSCH 1103 may be the SPS PDSCH 1103. A periodicity 1120 may be different from a periodicity 1121. After the periodicity 1120 from the end of the PDSCH 1100, the PDSCH 1101 may be received. After the periodicity 1120 from the PDSCH 1100, the PDSCH 1101 may be received. After the periodicity 1121 from the end of the PDSCH 1102, the PDSCH 1103 may be received. After the periodicity 1121 from the PDSCH 1102, the PDSCH 1103 may be received. The periodicity 1120 and the periodicity 1121 may be P2 in Equation 1. The periodicity 1120 and the periodicity 1121 may be P2 in Equation 2. The periodicity 1120 and the periodicity 1121 may be $N_{periodicity\_SPS}$ in Equation 3.

In FIG. 11, the HARQ process IDs for the PDSCH 1100, the PDSCH 1101, the PDSCH 1102, and the PDSCH 1103 may be the same. The HARQ process IDs of the PDSCH 1100 and the PDSCH 1101 may be different from the HARQ process IDs of the PDSCH 1102 and the PDSCH 1103.

In FIG. 11, the PDCCH 1110 may be a PDCCH for the PDSCH 1102. For example, the PDCCH 1110 may correspond to the PDSCH 1102.

In means 1, the PDCCH 1110 (or the DCI format in the PDCCH 1110) may deactivate the configured downlink assignment for the PDSCH 1100 and the PDSCH 1101. The PDCCH 1110 (or the DCI format in the PDCCH 1110) may deactivate the PDSCH 1100 and the PDSCH 1101. In means 1, the PDCCH 1110 (or the DCI format in the PDCCH 1110) may activate the configured downlink assignment for the PDSCH 1102 and the PDSCH 1103. The PDCCH 1110 (or the DCI format in the PDCCH 1110) may activate the PDSCH 1102 and the PDSCH 1103.

In means 1, the PDSCH 1100 and the PDSCH 1101 may correspond to a first configured downlink assignment. The PDSCH 1100 and the PDSCH 1101 may correspond to the first SPS PDSCH configuration. The PDSCH 1102 and the PDSCH 1103 may correspond to a second configured downlink assignment. The PDSCH 1102 and the PDSCH 1103 may correspond to the second SPS PDSCH configuration. The first SPS PDSCH configuration may be different from the second SPS PDSCH configuration. For example, the periodicity in the first SPS PDSCH configuration may be different from the periodicity in the second SPS PDSCH configuration. For example, the index in the first SPS PDSCH configuration may be different from the index in the second SPS PDSCH configuration. The periodicity in the first SPS PDSCH configuration may be the periodicity 1120. The periodicity in the second SPS PDSCH configuration may be the periodicity 1121.

In means 1, at time 1130, the PDSCH 1100 and the PDSCH 1101 may be activated, whereas the PDSCH 1102 and the PDSCH 1103 may be deactivated. At time 1131, the PDSCH 1100 and the PDSCH 1101 may be deactivated, whereas the PDSCH 1102 and the PDSCH 1103 may be activated.

In means 1, the CRC in the DCI format in the PDCCH 1110 may be scrambled with the CS-RNTI. The CRC in the DCI format in the PDCCH 1110 need not be scrambled with the CS-RNTI.

In means 1, validation of the PDCCH 1110 (or the DCI format in the PDCCH 1110) may be achieved. For example, validation of the activation and deactivation PDCCH 1110 may be achieved. For example, in a case that a specific field in the DCI format in the PDCCH 1110 has a specific value, validation of the DCI format corresponding to activation and deactivation may be achieved.

In means 1, the PDCCH 1110 (or content of the PDCCH 1110) may indicate SPS activation and SPS deactivation. For example, the PDCCH 1110 (or content of the PDCCH 1110) may indicate activation of the first SPS and deactivation of the second SPS. In a case that activation of the first SPS is indicated, the first MAC entity may store the configured downlink assignment corresponding to the first SPS. In a case that deactivation of the second SPS is indicated, the first MAC entity may clear the configured downlink assignment corresponding to the second SPS. In means 1, in a case that the NDI in the HARQ information is 0, whether the PDCCH 1110 (or content of the PDCCH 1110) indicates SPS activation and/or SPS deactivation may be determined.

In means 1, multiple SPS PDSCH configurations may be provided. In the first SPS PDSCH configuration, a first higher layer parameter may be configured. In the second SPS PDSCH configuration, a second higher layer parameter may be configured. The first higher layer parameter may determine the periodicity of the first SPS PDSCH. The second higher layer parameter may determine the periodicity of the second SPS PDSCH. The SPS PDSCH configuration index in the first SPS PDSCH configuration may be different from the SPS PDSCH configuration index in the second SPS PDSCH configuration.

In means 1, the PDCCH to which the DCI format is mapped may be received. The first SPS PDSCH may be activated based at least on the PDCCH (or the DCI format). The second SPS PDSCH may be deactivated based at least on the PDCCH (or the DCI format). The periodicity of the first SPS PDSCH may be different from the periodicity of the second SPS PDSCH.

In means 1, the HARQ-ACK information need not be provided in response to the deactivation of the SPS PDSCH.

In means 1, the first higher layer parameter may determine at least the periodicity of the first SPS PDSCH. The second higher layer parameter may determine at least the periodicity of the second SPS PDSCH. The first SPS PDSCH may be deactivated by the DCI format. The second SPS PDSCH may be activated by the DCI format. The periodicity of the first SPS PDSCH may be different from the periodicity of the second SPS PDSCH. The second SPS PDSCH may be received based on the second higher layer parameter, and the first SPS PDSCH need not be received.

In means 1, the SPS PDSCH configuration index corresponding to the first SPS PDSCH or the second SPS PDSCH may be indicated based on at least one DCI field included in the DCI format. For example, in means 1, validation of DCI format need not be achieved.

In means 2, the PDCCH 1110 (or the DCI format in the PDCCH 1110) need not deactivate the configured downlink assignment for the PDSCH 1100 and the PDSCH 1101. The PDCCH 1110 (or the DCI format in the PDCCH 1110) need not deactivate the PDSCH 1100 and the PDSCH 1101. In means 2, the PDCCH 1110 (or the DCI format in the PDCCH 1110) may activate the configured downlink assignment for the PDSCH 1102 and the PDSCH 1103. The PDCCH 1110 (or the DCI format in the PDCCH 1110) may activate the PDSCH 1102 and the PDSCH 1103.

In means 2, the PDSCH 1100 and the PDSCH 1101 may correspond to the first configured downlink assignment. The PDSCH 1100 and the PDSCH 1101 may correspond to the first SPS PDSCH configuration. The PDSCH 1102 and the PDSCH 1103 may correspond to the second configured downlink assignment. The PDSCH 1102 and the PDSCH 1103 may correspond to the second SPS PDSCH configuration. The first SPS PDSCH configuration may be the same as the second SPS PDSCH configuration. For example, the periodicity in the first SPS PDSCH configuration may be the same as the periodicity in the second SPS PDSCH configuration. For example, the index in the first SPS PDSCH configuration may be the same as the index in the second SPS PDSCH configuration. The periodicity in the first SPS PDSCH configuration may be the periodicity 1120. The periodicity in the second SPS PDSCH configuration may or may not be the periodicity 1121. In means 2, the periodicity 1120 may be different from the periodicity 1121.

In means 2, at time 1130, the PDSCH 1100 and the PDSCH 1101 may be activated, whereas the PDSCH 1102 and the PDSCH 1103 may be activated or deactivated. At time 1131, the PDSCH 1100 and the PDSCH 1101 need not be deactivated, whereas the PDSCH 1102 and the PDSCH 1103 may be activated.

In means 2, the CRC in the DCI format in PDCCH 1110 may be scrambled with the CS-RNTI. The CRC in the DCI format in the PDCCH 1110 need not be scrambled with the CS-RNTI.

In means 2, validation of the PDCCH 1110 (or the DCI format in the PDCCH 1110) may be achieved. For example, validation of the activation PDCCH 1110 may be achieved. For example, in a case that a specific field in the DCI format in PDCCH 1110 has a specific value, validation of the DCI format corresponding to activation may be achieved.

In means 2, the SPS PDSCH configuration indexes corresponding to the PDSCH 1100, the PDSCH 1101, the PDSCH 1102, and the PDSCH 1103 may be the same.

In means 2, the PDCCH 1110 (or content of the PDCCH 1110) may indicate SPS activation. For example, the PDCCH 1110 (or content of the PDCCH 1110) may indicate activation of the first SPS. In a case that activation of the first SPS is indicated, the first MAC entity may store the configured downlink assignment corresponding to the first SPS. In means 2, in a case that the NDI in the HARQ information is 0, it may be determined whether the PDCCH 1110 (or content of the PDCCH 1110) indicates SPS activation or SPS deactivation.

In means 2, the PDCCH 1110 (or the DCI format of the PDCCH 1110) may determine the periodicity 1121. For example, the PDCCH 1110 (or the DCI format of the PDCCH 1110) may update the periodicity 1120 to the periodicity 1121. For example, the PDCCH 1110 (or the DCI format of the PDCCH 1110) may determine the periodicity of the SPS PDSCH. For example, the PDCCH 1110 (or the DCI format of the PDCCH 1110) may determine the periodicity of the configured downlink assignment corresponding to PDSCH 1102. For example, the PDCCH 1110 (or the DCI format of the PDCCH 1110) may determine the periodicity of the SPS PDSCH corresponding to the PDSCH 1102.

In means 2, one or multiple SPS PDSCH configurations may be provided. In the first SPS PDSCH configuration, a first higher layer parameter may be configured. In the second SPS PDSCH configuration, a second higher layer parameter may be configured. The first higher layer parameter may determine the periodicity of the first SPS PDSCH. The second higher layer parameter need not determine the periodicity of the second SPS PDSCH. The first SPS PDSCH configuration may be the same as the second SPS PDSCH configuration. The first higher layer parameter may be the same as the second higher layer parameter. The periodicity of the second SPS PDSCH may be indicated by the DCI format. The SPS PDSCH configuration index in the first SPS PDSCH configuration may be the same as the SPS PDSCH configuration index in the second SPS PDSCH configuration.

In means 2, the PDCCH to which the DCI format is mapped may be received. The first SPS PDSCH may be activated based at least on the PDCCH (or the DCI format). The second SPS PDSCH may be deactivated based at least on the PDCCH (or the DCI format). The periodicity of the first SPS PDSCH may be different from the periodicity of the second SPS PDSCH.

In means 2, a first periodicity of the SPS PDSCH may be determined based at least on a certain higher layer parameter. A second periodicity of the SPS PDSCH may be determined based at least on the DCI format. The SPS PDSCH may be received based on the second periodicity. The first periodicity may be different from the second periodicity. The SPS PDSCH may be provided with two periods.

Various aspects of apparatuses according to an aspect of the present embodiment will be described below.

(1) In order to accomplish the object described above, an aspect of the present invention is contrived to provide the following means. Specifically, a first aspect of the present invention provides a terminal apparatus including a receiver configured to receive a DCI format, wherein a first higher layer parameter determines at least a periodicity of a first SPS PDSCH, a second higher layer parameter determines at least a periodicity of a second SPS PDSCH, the first SPS PDSCH is deactivated by the DCI format, the second SPS PDSCH is activated by the DCI format, the periodicity of the first SPS PDSCH is different from the periodicity of the second SPS PDSCH, and the receiver receives the second SPS PDSCH based on the second higher layer parameter.

(2) A second aspect of the present invention is a terminal apparatus including a receiver configured to receive a DCI format, wherein a first periodicity of an SPS PDSCH is determined based at least on a certain higher layer parameter, a second periodicity of the SPS PDSCH is determined based at least on the DCI format, and the receiver is configured to receive the SPS PDSCH based on the second periodicity.

(3) A third aspect of the present invention is a base station apparatus including a transmitter configured to transmit a DCI format, wherein a first higher layer parameter determines at least a periodicity of a first SPS PDSCH, a second higher layer parameter determines at least a periodicity of a second SPS PDSCH, the first SPS PDSCH is deactivated by the DCI format, the second SPS PDSCH is activated by the DCI format, the periodicity of the first SPS PDSCH is different from the periodicity of the second SPS PDSCH, and the transmitter is configured to transmit the second SPS PDSCH based on the second higher layer parameter.

(4) A fourth aspect of the present invention is a base station apparatus including a transmitter configured to transmit a DCI format, wherein a first periodicity of an SPS PDSCH is determined based at least on a certain higher layer parameter, a second periodicity of the SPS PDSCH is determined based at least on the DCI format, and the transmitter transmits the SPS PDSCH based on the second periodicity.

Each of a program running on a base station apparatus 3 and a terminal apparatus 1 according to the present invention may be a program that controls a Central Processing Unit (CPU) and the like, such that the program causes a computer to operate in such a manner as to realize the functions of the above-described embodiment according to the present invention. Also, the information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral device. Furthermore, a "computer-readable recording medium" refers to a portable medium such as a flexible disk, a magneto-optical disk, a ROM, a CD-ROM, and the like, and a storage device such as a hard disk built into the computer system.

Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Furthermore, the base station apparatus 3 according to the aforementioned embodiment may be achieved as an aggregation (apparatus group) including multiple apparatuses.

Each of the apparatuses included in such an apparatus group may include each function, or some or all portions of each functional block of the base station apparatus 3 according to the aforementioned embodiment. As the apparatus group, it is only necessary to have a complete set of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a Next-Gen RAN (NG-RAN or NR RAN). Moreover, the base station apparatus 3 according to the aforementioned embodiment may have some or all of the functions of a higher node for an eNodeB and/or a gNB.

Some or all portions of each of the terminal apparatus 1 and the base station apparatus 3 according to the aforementioned embodiment may be implemented as an LSI which is a typical integrated circuit or may be implemented as a chip set. The functional blocks of each of the terminal apparatus 1 and the base station apparatus 3 may be individually implemented as a chip, or some or all of the functional blocks may be integrated into a chip. Furthermore, a circuit integration technique is not limited to the LSI, and may be realized with a dedicated circuit or a general-purpose processor. Moreover, in a case that with advances in semiconductor technology, a circuit integration technology with which an LSI is replaced appears, it is also possible to use an integrated circuit based on the technology.

In addition, although the aforementioned embodiments have described the terminal apparatus as an example of a communication apparatus, the present invention is not limited to such a terminal apparatus, and is applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not depart from the gist of the present invention. Furthermore, in the present invention, various modifications are possible within the scope of claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

REFERENCE SIGNS LIST 1 (1A, 1B, 1C) Terminal apparatus
3 Base station apparatus
10, 30 Radio transmission and/or reception unit
10a, 30a Radio transmitting unit
10b, 30b radio receiving unit
11, 31 Antenna unit
12, 32 RF unit
13, 33 Baseband unit
14, 34 Higher layer processing unit
15, 35 Medium access control layer processing unit
16, 36 Radio resource control layer processing unit 91, 92, 93, 94 Search space set
300 Component carrier
301 Primary cell
302, 303 Secondary cell
700 Set of resource elements for PSS
710, 711, 712, 713 Set of resource elements for PBCH and for DMRS for PBCH
720 Set of resource elements for SSS
3000 Point
3001, 3002 Resource grid
3003, 3004 BWP
3011, 3012, 3013, 3014 Offset
3100, 3200 Common resource block set
1100, 1101, 1102, 1103 PDSCH
1110 PDCCH
1120, 1121 Periodicity
1130, 1131 Time

The invention claimed is:

1. A terminal apparatus comprising a receiver configured to receive a downlink control information (DCI) format, wherein
a first higher layer parameter determines at least a periodicity of a first semi-persistent scheduling (SPS) physical downlink shared channel (PDSCH),
a second higher layer parameter determines at least a periodicity of a second SPS PDSCH,
the first SPS PDSCH is deactivated by the DCI format,
the second SPS PDSCH is activated by the DCI format,
the DCI format indicates a hybrid automatic repeat request (HARQ) process identifier (ID),
the HARQ process ID is for both the first SPS PDSCH and the second SPS PDSCH,
the periodicity of the first SPS PDSCH is different from the periodicity of the second SPS PDSCH, and
the receiver is further configured to receive the second SPS PDSCH based on the second higher layer parameter.

2. The terminal apparatus according to claim 1, wherein an SPS PDSCH configuration index corresponding to the first SPS PDSCH or the second SPS PDSCH is indicated based at least on one DCI field included in the DCI format.

3. A base station apparatus comprising a transmitter configured to transmit a downlink control information (DCI) format, wherein
a first higher layer parameter determines at least a periodicity of a first semi-persistent scheduling (SPS) physical downlink shared channel (PDSCH),
a second higher layer parameter determines at least a periodicity of a second SPS PDSCH,
the first SPS PDSCH is deactivated by the DCI format,
the second SPS PDSCH is activated by the DCI format,
the DCI format indicates a hybrid automatic repeat request (HARQ) process identifier (ID),
the HARQ process ID is for both the first SPS PDSCH and the second SPS PDSCH,
the periodicity of the first SPS PDSCH is different from the periodicity of the second SPS PDSCH, and
the transmitter is further configured to transmit the second SPS PDSCH based on the second higher layer parameter.

4. The base station apparatus according to claim 3, wherein
an SPS PDSCH configuration index corresponding to the first SPS PDSCH or the second SPS PDSCH is indicated based at least on one DCI field included in the DCI format.

* * * * *